US012233389B2

(12) United States Patent
Duerinck et al.

(10) Patent No.: US 12,233,389 B2
(45) Date of Patent: Feb. 25, 2025

(54) GENERATIVE SCENT DESIGN SYSTEM

(71) Applicant: Scentronix Inc., Dover, DE (US)

(72) Inventors: Frederik Duerinck, Breda (NL); Vincent Soffers, Breda (NL)

(73) Assignee: Scentronix Inc., Dover, DE (US)

(*) Notice: Subject to any disclaimer, the term of this patent is extended or adjusted under 35 U.S.C. 154(b) by 338 days.

(21) Appl. No.: 17/609,168

(22) PCT Filed: May 5, 2020

(86) PCT No.: PCT/US2020/031533
§ 371 (c)(1),
(2) Date: Nov. 5, 2021

(87) PCT Pub. No.: WO2020/227329
PCT Pub. Date: Nov. 12, 2020

(65) Prior Publication Data

US 2022/0226791 A1 Jul. 21, 2022

Related U.S. Application Data

(63) Continuation-in-part of application No. PCT/US2019/031217, filed on May 7, 2019.
(Continued)

(51) Int. Cl.
*B01F 33/84* (2022.01)
*B01F 33/841* (2022.01)
(Continued)

(52) U.S. Cl.
CPC ........ *B01F 33/8442* (2022.01); *B01F 33/841* (2022.01); *B01F 33/846* (2022.01); *B01F 33/848* (2022.01); *B01F 33/85* (2022.01); *B01F 35/2115* (2022.01); *B01F 35/2215* (2022.01); *B01F 35/7176* (2022.01); *B01F 35/71805* (2022.01); *B01F 35/92* (2022.01);
(Continued)

(58) Field of Classification Search
CPC .... B01F 33/841; B01F 33/846; B01F 33/848; B65B 43/52
See application file for complete search history.

(56) References Cited

U.S. PATENT DOCUMENTS

2013/0214469 A1 * 8/2013 Terzini .................. B23Q 1/032 269/287

* cited by examiner

*Primary Examiner* — Paul J Gray
(74) *Attorney, Agent, or Firm* — Stoyanov Law PLLC; Roy Chan

(57) ABSTRACT

A generative scent design system has a frame, an input receiver, an input processor, a dispenser, a container, and a filling platform. The dispenser has a dosing station and a storage compartment. The dosing station and the filling platform are attached to the frame. The dosing station has a plurality of pumps. The heating system regulates its associated pump's temperature. The storage compartment has scent vessels that contain a respective scent. Each pump with an inlet and an outlet is associated with a respective heating system and respective scent; in fluid communication through the inlet with the scent vessel containing the respective scent; and configured to dispense its respective scent through the outlet. The container is movably positioned on the filling platform to receive the respective scent from each pump. The input receiver receives data. The input processor calculates the data to determine a formulation of respective scents.

18 Claims, 25 Drawing Sheets

Related U.S. Application Data

(60) Provisional application No. 62/668,224, filed on May 7, 2018.

(51) Int. Cl.

| | |
|---|---|
| ***B01F 33/85*** | (2022.01) |
| ***B01F 35/21*** | (2022.01) |
| ***B01F 35/221*** | (2022.01) |
| ***B01F 35/71*** | (2022.01) |
| ***B01F 35/92*** | (2022.01) |
| ***B65B 43/52*** | (2006.01) |
| ***B65C 3/06*** | (2006.01) |
| ***B67B 3/14*** | (2006.01) |
| *B01F 35/90* | (2022.01) |
| *B01F 101/21* | (2022.01) |

(52) U.S. Cl.

CPC .............. *B65B 43/52* (2013.01); *B65C 3/065* (2013.01); *B67B 3/14* (2013.01); *B01F 2035/99* (2022.01); *B01F 2101/21* (2022.01)

ALGORITHMIC BEAUTY

SYSTEM ON

SYSTEM STATUS: GENERATING

CURRENT GENERATION: Generation 2023 ▾ Bottle this Generation?

COMPOSED OF:

| SCENT | | | SOUND | ITERATION |
|---|---|---|---|---|
| WOODY | 3.38 | % | f_04 | 14 |
| GREENS | 12.84 | % | f_07 | 11 |
| ETHER | 7.43 | % | f_11 | 34 |
| WET | 0.00 | % | f_29 | 0 |
| SOIL | 12.16 | % | f_33 | 49 |
| ZEST | 12.84 | % | m_4 | 48 |
| ANIMAL | 6.76 | % | m_8 | 12 |
| FLORAL | 33.11 | % | M_26 | 49 47 |
| LUMINOUS | 11.49 | % | m_36 | 46 |

RESET CONTROLLER | CONTROLLER

230

211

GENERATIVE SCENT DESIGN SYSTEM

CROSS-REFERENCE TO RELATED APPLICATIONS

This application is a continuation-in-part of PCT/US2019/031217, filed May 7, 2019, currently pending, which claims priority to U.S. Provisional Application No. 62/668,224, filed May 7, 2018, both of which are hereby incorporated by reference in their entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM

LISTING COMPACT DISC APPENDIX

Not Applicable

BACKGROUND OF THE INVENTION

The present invention is related to a system to create unique and custom scents (fragrances, perfumes) in real time based upon input from a user. The system may also be utilized for creating other unique and custom formulations of beverages, alcohols, juices, medications, lotions, shampoos and other products.

BRIEF SUMMARY OF THE INVENTION

An object of the present invention is a generative scent design system comprising a frame, an input receiver, an input processor, a dispenser, a container, and a filling platform. The dispenser comprises a dosing station and a storage compartment. The dosing station and the filling platform are attached to the frame. The dosing station comprises a plurality of pumps. Each pump is associated with a respective heating system. The respective heating system regulates the temperature of its associated pump. The storage compartment comprises a plurality of scent vessels. Each scent vessel contains a respective scent. Each pump comprises an inlet and an outlet. Each pump is associated with its respective scent. Each pump is in fluid communication through the inlet with the scent vessel containing the respective scent. Each pump is configured to dispense its respective scent through the outlet. The container is movably positioned on the filling platform to receive the respective scent from each pump. The input receiver receives data. The data is selected from the group consisting of questionnaire answers, user-entered data, social-media based data, biometric feedback, stock exchange based data, weather based data, personal emotion based data, sports based data, sound based data, smell based data, sensor based data, image based data, and combinations thereof. The input processor calculates the data to determine a formulation containing an amount of each respective scent.

In another object of the present invention, a generative scent design system comprises a frame, an input receiver, an input processor, a dispenser, a container, and a filling platform. The dispenser comprises a dosing station and a storage compartment. The dosing station and the filling platform are attached to the frame. The dosing station comprises a plurality of valves. Each valve is associated with a respective heating system. The respective heating system regulates the temperature of its associated valve. The storage compartment comprises a plurality of scent vessels. Each scent vessel contains a respective scent. Each valve comprises an inlet and an outlet. Each valve is associated with its respective scent vessel. Each valve is in fluid communication with its respective scent vessel through the inlet. Each valve is configured to dispense its respective scent through the outlet. The container is movably positioned on the filling platform to receive the respective scent from each valve. The input receiver receives data. The data is selected from the group consisting of questionnaire answers, user-entered data, social-media based data, biometric feedback, stock exchange based data, weather based data, personal emotion based data, sports based data, sound based data, smell based data, sensor based data, image based data, and combinations thereof. The input processor calculates the data to determine a formulation containing an amount of each respective scent.

BRIEF DESCRIPTION OF THE SEVERAL VIEWS OF THE DRAWING

The advantages and features of the present invention will be better understood as the following description is read in conjunction with the accompanying drawings, wherein.

DETAILED DESCRIPTION OF THE INVENTION

Figure 1:
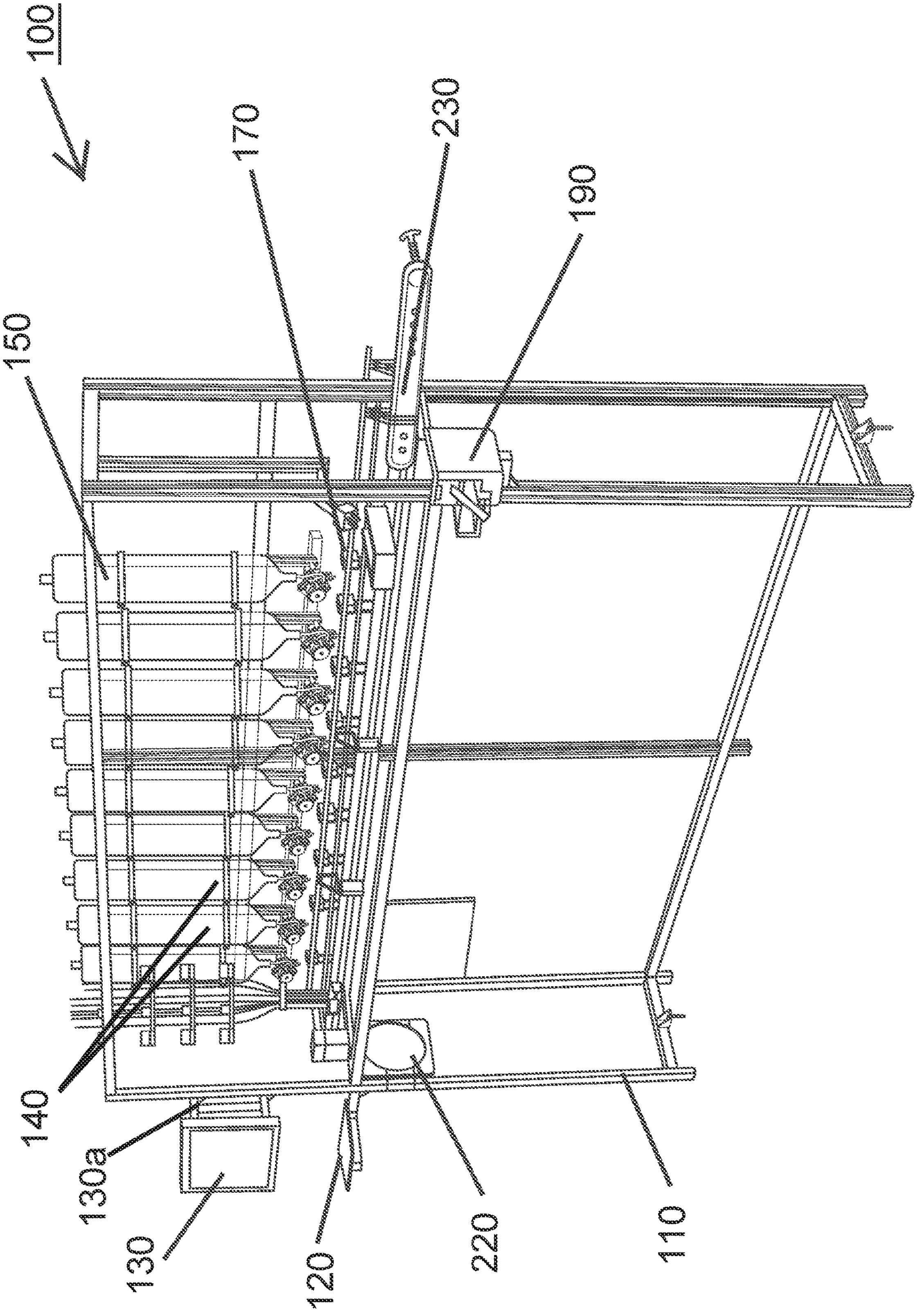
FIG. 1 is a perspective view of an embodiment of the present invention.

The figures illustrate a generative scent design system 100 comprising an input receiver 120, an input processor 130*a*, a plurality of scents 140, a plurality of scent dispensers 150, a conveyor 160, a plurality of motion sensors 170, a container 180, a container dispenser system 300, a label 192, a cap 210, at least one sound output device 220, and at least one visual output device 130.

As illustrated, e.g., in FIG. 1, an embodiment of the present invention includes a plurality of scent dispensers 150 attached to a frame 110. Also attached to the frame 110 is an input processor 130*a* such as a computer and related peripherals. The peripherals include, but are not limited to, a display, a keyboard, speakers (sound output device 220), and a label maker (label printer 190). A user may provide input data into the input processor 130*a* to generate a formulation (the generated formulation is also referred to as "generation"). Alternatively, the formulation (or generation) may be generated from input data provided remotely to the input processor 130*a* or received by the input processor 130*a* from the ambient surroundings. With that formulation (or generation), a unique and custom scent or perfume can be made. A container 180 may be placed (e.g., automatically by the container dispenser system 300, by a user or operator, or by other instrumentality) on a conveyor 160 and moves along under each of the scent dispensers 150. Each scent dispenser 150 contains a scent. As the container 180 moves along the conveyor 160, the container 180 is filled with scents from the scent dispensers 150 according to the formulation. After the container 180 is filled, a cap 210 is placed on the container 180. Then, a label 192 is generated by the label maker 190 for that particular container 180 and formulation (or generation). Although the components are shown to be attached to the frame 110 in the figures, the invention does not require that all the components to be attached to the frame 110. The plurality of dispensers 150, the conveyor 160, and the plurality of motion sensors 170 are attached to the frame 110, However, other components, such as the input receiver 120, the input processor 130*a*, the label printer 190, the sound output device 220 and the visual output device 130 are not required to be attached to the frame 110. For example, the information may be transmitted wirelessly to the sound output device 220, which may not be attached to the frame 110.

Figure 2:
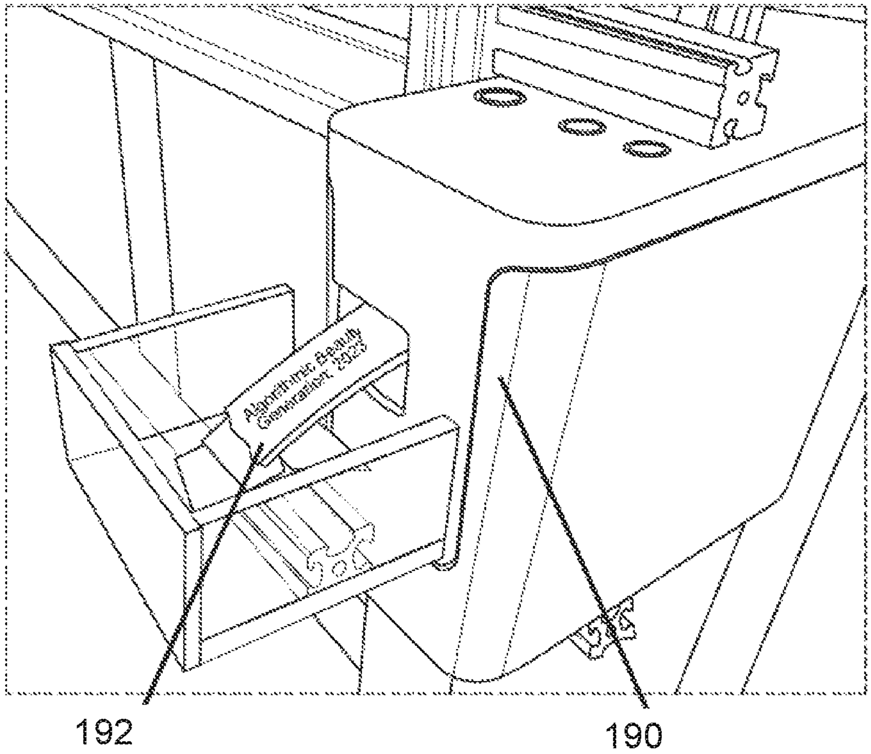
FIG. 2 is a partial view of an embodiment of the present invention.

On the label 192 is a specific code representing a specific generation (or scent formulation), as illustrated in FIG. 2. The code can be in a digital or physical format, it can be numeric, text, 2D or 3D barcode, QR Code or similar. The unique code allows the user to recreate the scent formulation at any time—immediately after the first time the formulation was generated, or at a later time. The user can also share the unique code with others to enable them to recreate the same formulation of scent. The unique code can be associated with a user, and can be used for various purposes, such as membership, loyalty programs, community programs, affiliate programs, cash back (or royalties) for sales of perfumes created by users, or others.

The scent dispenser 150 may include valves and flowmeters. The computer controls the scent dispensers 150 including the valves and flowmeters to dispense the proper amount of each scent. The amount of each scent maybe a positive volume or weight, or maybe 0 (zero) for any scent that does not need to be dispensed. In another embodiment, if no amount is provided for a scent, that scent will not be dispensed. The scent dispensers 150 contain different scents (single ingredient or compound, neat oil (without a carrier) or in solution). Each scent dispenser 150 may contain pure scents, such as essential oils (neat, without a carrier), or mixture of oils with carriers, or other perfume bases. For example, in the embodiment illustrated in the figures, the scent dispensers 150 contain scents, premixed with carriers (e.g., perfume base, alcohol, water, soap, acetone, etc.), named as follows: Animal, Ether, Floral, Greens, Luminous, Soil, Wet, Woody, and Zest. The system may contain more scent dispensers 150 with more scents, and different scents. The scent in the scent dispensers 150 can be proprietary, can be based on the Perfume (or Fragrance) Wheel, or can be any other scents (liquid or powder), neat oils, or other perfume ingredients, or any of the foregoing perfume ingredients diluted with alcohol or with added stabilizers.

In different embodiments the scent dispensers 150 may contain other liquids, for example, different juices, alcoholic beverages, flavors, health supplements, and others, health and beauty products and ingredients. The liquids maybe pure ingredients, such as flavors (e.g., jasmine, strawberry, apple, etc.), colors (e.g., blue, red, green, violet, etc.), alcohols (e.g., gin, vodka, vermouth, rum, whiskey, etc.), fruit juices (e.g., apple, pineapple, pear, orange, etc.), soaps, oils, surfactants, and others, or may be a mixtures or solutions of multiple pure ingredients, or maybe mixture or solutions with a base liquid (e.g., water, sugar syrup, soap base, shampoo base, etc.).

Scent throughout this disclosure is used interchangeably with Ingredient, and scent and ingredient each should be understood as non-limiting to a type of liquid, or mixtures (of, e.g., liquids, solids, gases, etc.), or solutions (of, e.g., liquids, solids, gases, etc.).

Figure 10:
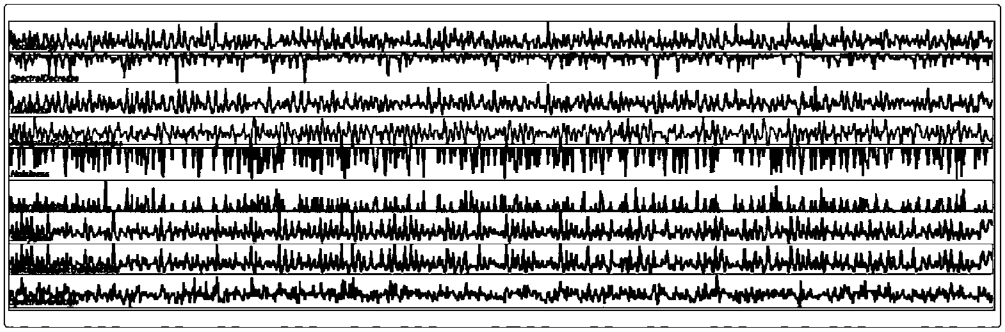
FIG. 10 is a screenshot in an embodiment of the present invention

FIG. 10 illustrates a screenshot from visual output device 130 showing a generation (or generated scent formulation), based upon which the scents are dispensed (e.g., Woody 3.38%; Greens 12.84%; Ether 7.43%; Wet 0.00%; Soil 12.16%; Zest 12.84%; Animal 6.76%; Floral 33.11%, Luminous 11.49%)

In one embodiment of the invention, the scents may be described according to their characteristics or features in several categories ("Feature Categories"). Exemplary Feature Categories are illustrated in the following table. As illustrated in the table, the Feature Categories may be represented by a numeric value, text, color picker, geographical coordinates, or a combination of the foregoing.

| Example Feature Categories Describing Scents | | | |
|---|---|---|---|
| Temporal: Longest to least long-lasting; Numeric/Scale | Energy: Most to least diffusive; Numeric/ Scale | Perceptual: Sharpest to least sharp/rounder Numeric/Scale | Harmonic: Most to least pleasant Numeric/ Scale |
| Color: Text, numeric, color picker, e.g. Blue | Texture: Text, e.g. Cotton | Emotion/Mood: Text, e.g. Scared | Associations: Text, e.g. with locations, events, feelings. |
| Season: Text | Weather: Text, Numeric | Natural/Unnatural: Numeric/Scale | Sensations: Text or Numeric |
| Olfactive Territories/ Families: Text, geolocation, e.g. citrus, green, floral, woody, forest | Memories: Text | Biometric data: response to ingredients, scents | Price, Regulatory Data, CAS Number |
| Origin | Naturals/Synthetic | Molecule family | List of opposites. Text, numeric |

The Feature Categories depend on the type of input data. Some Feature Categories can be applied to multiple types of input data. For example, the Temporal Categories (describing, e.g., lastingness of input data) can be applied to sound (audio), visual input (light, colors, etc.), and others.

The value (e.g., numeric, text, color, etc.) of the Feature Categories is calculated by the input processor 130*a* based on measurement or analysis of various input data parameters. For example, the Feature Categories for sound input may be characterized by parameters shown in the following example of a Sound Feature Category table:

| Sound Features/Category | Measured Parameters |
|---|---|
| Temporal (Life span: Lastingness/ Volatility of scent); Scale - Numeric value | Total Energy, Loudness, Spectral Decrease |
| Energy (Physical presence/ Diffusion of scent); Scale/ Numeric value | Spectral Spread, Spectral Skewness, Perceptual Spectral Variation |
| Harmonic (Stylistic/Pleasant versus disruptive); Scale/Numeric value | Harmonic Energy, Noise Energy, Noisiness, Inharmonicity |
| Perceptual (Shape & Aesthetics: linear, sharp, round liquid); Scale/Numeric value | Perceptual Spectral Centroid, Sharpness Spectral Flatness, Harmonic Energy |

The individual scents may be categorized according to the Features Categories in a relationship such that particular scent will correlate to a particular description for a Feature Category. For example, a particular scent may correlate to a particular value for the Temporal Feature Category. Within the scope of this invention, the Feature Categories are referred to as Scent Descriptors in their association with scents. The following table illustrates Scent Descriptors (Feature Categories) for sound input data with their associated scents. For example, the scents maybe ordered as shown in the following Scents Categories & Sound Input table, where the top scent represents the "most" and the bottom the "least" of the scale).

| Temporal- Longest to shortest lasting) | Energy-Most to least diffusive | Perceptual-Most to least sharp | Harmonic-Most to least harmonic |
|---|---|---|---|
| Ether | Floral | Soil | Floral |
| Animal | Wet | Woody | Ether |
| Woody | Soil | Luminous | Zest |
| Floral | Woody | Wet | Animal |
| Soil | Zest | Greens | Greens |
| Wet | Animal | Zest | Woody |

-continued

| Temporal- Longest to shortest lasting) | Energy-Most to least diffusive | Perceptual-Most to least sharp | Harmonic-Most to least harmonic |
|---|---|---|---|
| Greens | Greens | Floral | Wet |
| Luminous | Luminous | Animal | Soil |
| Zest | Ether | Ether | Luminous |

The input receiver 120 can receive input data from a user, from the surroundings, from another device, or from its own stored data. For example, a user can provide input by typing, scanning a document, uploading a file to the system, speaking into a microphone, and various other methods. The input receiver 120 can also collect input data from the surroundings, for example, noise and light levels, music, radio frequencies, etc. The input data can also be provided to the input receiver 120 via another device, such as a mobile device via wireless communications, or from network or internet location that contains the data. The input processor 130*a* may be a computer, mobile device, cloud computing device, or another computing or microprocessor-based device, together with peripheral devices, such as a display, keyboard, touchpad, stylus, and other peripheral devices. The input receiver 120 may also comprise various instrumentation for receiving, sensing, measuring or detecting the input data, such as microphones, temperature sensors, light/dark sensor, color sensors, radio frequency sensors, spectral analyzers, sound frequency analyzer, vision systems and cameras, face recognition, microphones, text recognition, voice recognition, image recognition, biometric sensors, and numerous others. In some embodiments, one device may act both as an input receiver 120 and a visual output device 130; for example, a monitor that has touch-screen capabilities.

In an embodiment for an autonomous generative scent creation process, the input receiver 120 can also receive input data on its own from previously created generations (or formulations) of scent. Such embodiment may be configured to continuously generate new scent formulations without external input, based on internally provided input data.

The input data may be questionnaire answers, chosen price ranges, chosen ingredients (e.g., specific scents, categories of scents, Naturals or Synthetic, etc.) user-entered data, social-media based data, biometric feedback, financial data, stock exchange-based data, weather-based data, personal/emotion-based data, sports-based data, sound-based data, scent(s)-based data, sensor-based data, image-based data, and combinations thereof. The user may utilize a mobile application to generate the data. For example, the mobile application may have a questionnaire to which the user provides answers. The answers are then transmitted to the input processor 130*a*. Additionally, the user may input data directly into the input processor 130*a*. Alternatively, the input processor 130*a* may receive data in the forms of social-media based data, biometric feedback, stock exchange-based data, weather-based data, personal emotion-based data, sports based data, sound based data, scent(s)-based data, sensor-based data, or image-based data.

The input processor 130*a* ingests the input data and analyzes it. For example for sound input data the input processor 130*a* can measure various parameters that describe the sound ("Sound Descriptors") such as Total Energy, Loudness, Spectral Decrease, Spectral Spread, Spectral Skewness, Perceptual Spectral Variation, Harmonic Energy, Noise Energy, Noisiness, Inharmonicity, Perceptual Spectral Centroid, Sharpness Spectral Flatness, Harmonic Energy, and others. For example, for a sound input data, the input processor 130*a* may analyze the context of a song. For visual input data (e.g., image(s), video(s), surrounding(s), etc.), the input processor 130*a* may analyze the data for presence and amount of different color, hue, darkness and lightness, luminosity, what is the in the scene, the presence and number of people, whether the image is of urban or nature environment, and various other indicators ("Visual Descriptors"). For people (whether in an image or surroundings) the input processor 130*a* may analyze the facial expression and emotions, assess and assign a value (e.g., on a sliding scale) for gender, ethnicity, race, age, etc. ("Personal Descriptors"). For text input, the input processor 130*a* may analyze the source, the context and any known associations with it.

Based upon the analysis of the input data the input receiver 120 creates a description of the input data. The description may be numeric, text or both. For example, for sound input data, the input processor 130*a* will assign a numeric value to several categories that describe the features of the sound input data. Such categories may be 1) Temporal Features, 2) Energy Features, 3) Perceptual features and 4) Harmonic features. The numeric value assigned to each category of features will be based on the analysis of the appropriate Sound Descriptors representative of each feature category, as set forth in the Sound Feature Category table. Also as set forth in the table the numeric value represents the level each feature is present in the sound input data. For example the numeric value for the Temporal Features category will be representative of the sound input data on a scale of Most Long-Lasting to Least Long-Lasting (e.g., a high number may represent a long lasting sound, while a low number a short sound, or vice versa).

Similarly, for an image (or other visual) input data, the input processor 130*a* creates a description of the input data by assigning a numeric value to several feature categories based on the Visual Descriptors, and on Personal Descriptors if people are present. Those features categories may include Brightness, Hue, Color Palette, Contrast, People, Nature, and if people are present, Emotion.

In addition to or instead of, numeric values the input processor 130*a* may assign text descriptors to the input data. For example the text descriptor may include descriptive words, such as "bright," "blue," "fast," "allegro," "warm," "emotional," "sad," "green," "grey," "sunny," "forest," "wild," "disharmony," "melodic," and numerous others. The input processor 130*a* may also associate additional text descriptors to the exemplary text descriptors in the previous sentence based on the input. For example, the "grey" descriptor may be associated with the additional descriptors "dull" and/or "risk avoiding."

Figure 7:
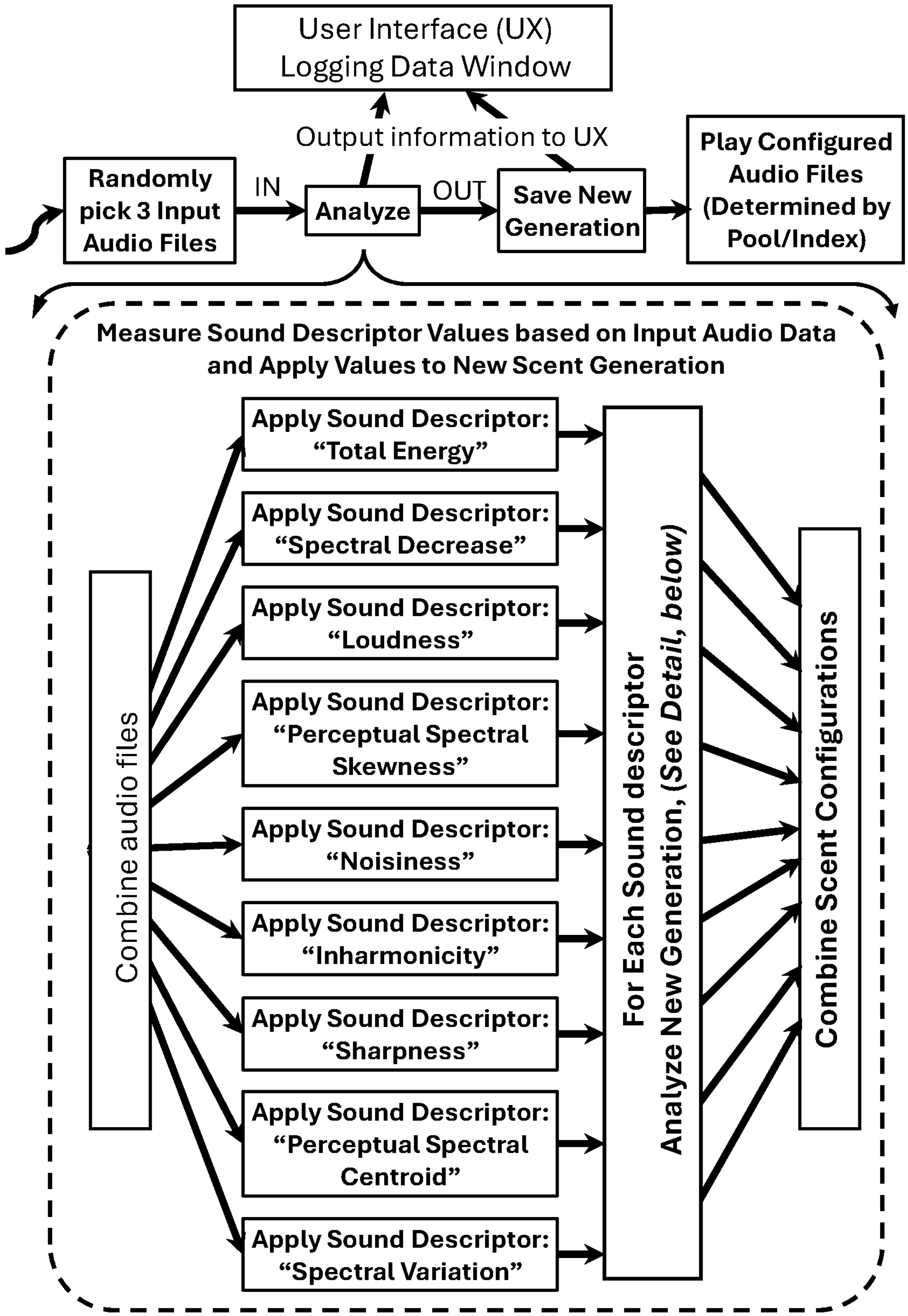
FIG. 7 is a diagram of an embodiment of the present invention.
Figure 7:
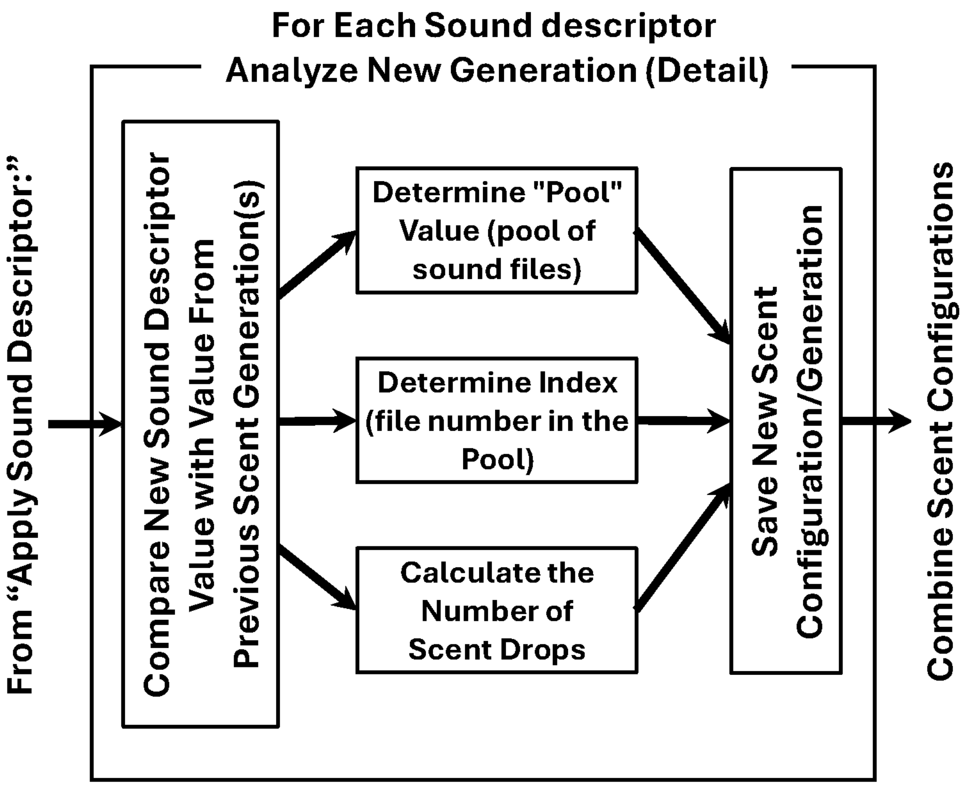

Based on the analysis performed by the input processor 130*a*, the algorithm correlates the input data descriptors to the Scent Descriptors (i.e. Feature Categories) and creates a "recipe" (also referred to as a formulation, or generation) for mixing of the different scents (single ingredients, or compounds). Based on the description (numeric, text, or other) of Features Categories the algorithm selects the different scents and the amount of each scent to dispense. For example, for long lasting sound input data (e.g., in the Temporal Feature Category), the algorithm processor may select "Ether" scent, and an amount based on a pre-programmed algorithm. Based on the Harmonic, Perceptual, and Energy Feature Categories for the same sound the algorithm processor may select different amounts of the following scents Woody, Greens, Ether, Wet, Soil, Zest, Animal, Floral and Luminous resulting in a recipe as illustrated in FIG. 10. The input processor 130*a* and algorithm may operate as illustrated in the flow-chart in FIG. 7.

In the preceding algorithm, input data audio files are selected and analyzed according to the sound Feature Categories illustrated in the Example Feature Categories Describing Scents Table, above. The analysis results in a configuration for each Feature Category. In one example, each Feature Category configuration consist of a "pool", "index," and "drops." The configurations for each Feature Category are combined into a single configuration, which is then saved as a new generation/formulation.

A system embodying the algorithm illustrated in the figure above, may select (e.g., randomly or not) several (e.g., 3) input data audio files from existing pre-stored audio files (e.g., 450 files). The existing audio files are divided into pools of a smaller number of files (e.g., 50 files). Each of the pools is associated with a specific scent dispenser 150, or container 1151.

For each of the Sound Descriptors the algorithm may perform the following steps:

1) Determine from which pool to select a file for each Sound Descriptor. This is the "pool" value in the configuration.
2) Select a file from the chosen pool. This is the "index" value.
3) Calculate the number of drops in the scent formulation for each Sound Descriptor.

In one example, the process for the creation of a generation of fragrance starts by selecting 3 input audio files randomly, but more or less audio files may be selected. The audio files may be selected by a user, may be received by the input receiver 120 (e.g., as files, through a microphone, or other methods).

To select the pool for each Sound Descriptor, the algorithm calculates the mean for the Sound Descriptor for each of the input audio files. This calculation results into one file having the highest mean value, one file having the lowest mean value and one file having a value in between the highest and the lowest. The difference between the highest and the lowest value is divided by a predetermined number. In this example, the predetermined number is 9, corresponding to the number of Sound Descriptors or to the number of scents in each Scents Category for Sound Input Data, illustrated above. If the middle value is below the median, the algorithm chooses the first whole number below the median on this scale of 9. If the middle value is above the median, the algorithm chooses the first whole number above the median on this scale of 9. This number determines from which pool the algorithm will select a file for a particular Sound Descriptor. The algorithm repeats this process of selecting a pool for each Sound Descriptor. Each pool may be associated with a specific scent dispenser 150, or container 1151.

To select the index (e.g., number corresponding to a file within the chosen pool) for each Sound Descriptor, the algorithm calculates the median value of the Sound Descriptor for each of the input audio files. The algorithm then subtracts the lowest median value from the highest median value for each Sound Descriptor and divides the number of files by the result, and the quotient provides a scale in which the highest median value will correspond to the highest possible index and the lowest median will correspond to the lowest index. To determine the scale, for example, the algorithm may determine the straight line on a Cartesian (e.g., X, Y) coordinate system defined by the X, Y number pairs (highest median, highest index) and (lowest median, lowest index). In the next step the algorithm calculates a new median ("Median.new") of the previously calculated median values. In the example with three median values (i.e., three input audio files), Median.new will be the middle value. Next the algorithm determines the index to which Median.new corresponds by mapping Median.new to the scale determined above (e.g., an X-Y straight line). The resulting number represents the index, corresponding to a file in the pool.

To select the number of drops (e.g., the amount of particular scent determined by the pool, above) for each Sound Descriptor, the algorithm operates as follows. The algorithm calculates the mean (value z) of the means (as calculated above) for each Sound Descriptor. Next, the algorithm maps z on a scale of the number of files in the pool (e.g., 50) of what could have been the maximum and minimum value for this Sound Descriptor. The algorithm subtracts z from the chosen index (e.g., audio file number) calculated above, and converts the resulting number to an absolute number. The resulting absolute number, x, represents a number of drops of a scent for each Sound Descriptor.

Figure 8:
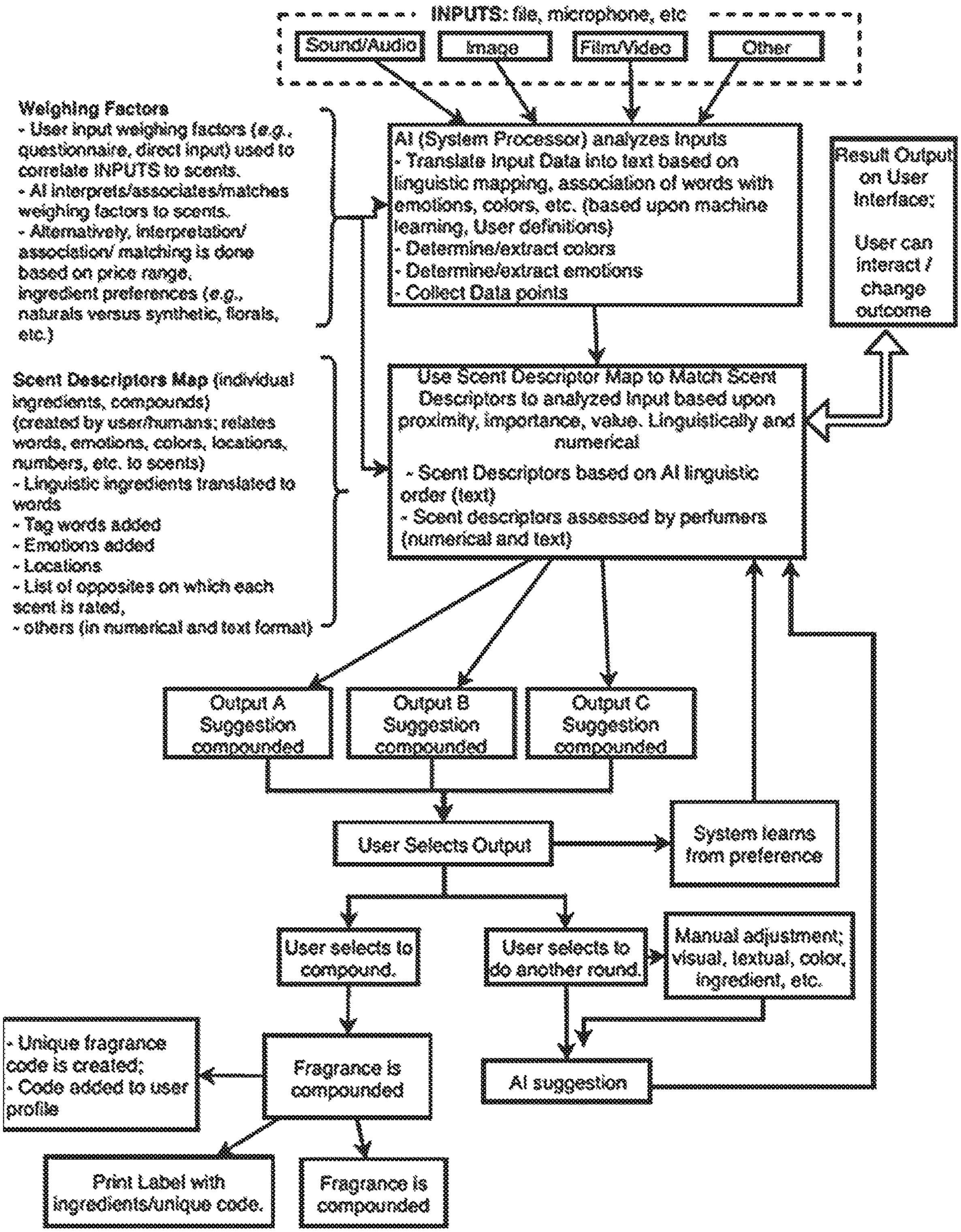
FIG. 8 is a diagram of an embodiment of the present invention.

After calculating the configuration for each Sound Descriptor by determining the pool, index, and drops as described above, the algorithm combines the individual configurations. The algorithm adds the x (drops) values for all Sound Descriptors and calculates the percentage per Sound Descriptor within the formulation of the currently generated fragrance (i.e., generation). Because each pool is associated with a specific scent dispenser 150, the drops associated with each pool (i.e., scent) are calculated as a percentage of the total amount of drops for the formulation. This percentage is calculated into an absolute amount of volume of ingredient (e.g., scents) per scent dispenser 150 for each Scent Descriptor so that the desired quantity is being compounded in the correct ratio. The processor 130*a* and algorithm may be programmed to correlate the input data to the scents according to the flow chart shown on FIG. 8.

Figure 6:
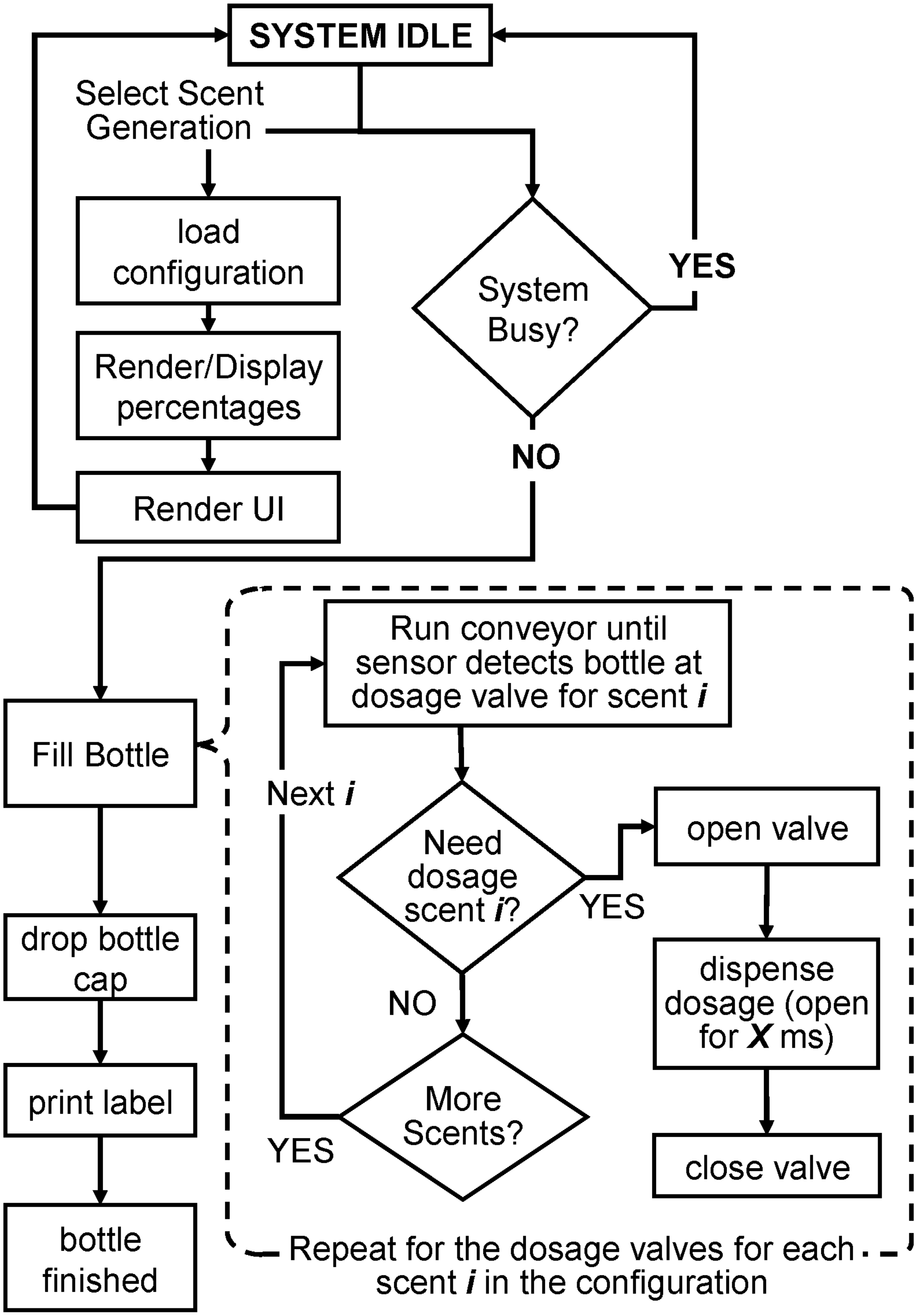
FIG. 6 is a diagram of an embodiment of the present invention

The amount of each of the plurality of scents 140 are dispensed from the plurality of scent dispensers 150 into the container 180. The container 180 is transported on the conveyor 160 to allow the container 180 to be movably positioned to receive each of the plurality of scents 140 from each of the plurality of scent dispensers 150. The plurality of motion sensors 170 guide the container 180 on the conveyor 160. The input processor 130*a* generates information for the label 192 and the unique code. The label 192 is affixed to the container 180. The cap 210 is secured to the container 180. FIG. 6 illustrates an exemplary algorithm for dispensing the specific amounts of scent.

In another embodiment, system can allow a user to convert scent to specific sound. In this embodiment, the input processor 130*a* calculates the data to generate sounds. The at least one sound output device 220 outputs the sounds. The input processor 130*a* translates scent properties to sound properties. The scent properties include (1) Life Span, (2) Physical Presence, (3) Stylistic, and (4) Shape/Aesthetics. Life Span is the lastingness or volatility of the scent. Life Span may be translated to the sound properties (a) Total Energy, (b) Loudness, and (c) Spectral Decrease. Physical Presence is the diffusion of the scent. Physical Presence may be translated to the sound properties (a) Spectral Spread, (b) Spectral Skewness, and (c) Perceptual Spectral Variation. Stylistic is the pleasantness of the scent compared to its disruptiveness. Stylistic may be translated to the sound properties (a) Harmonic Energy, (b) Noise Energy, (c) Noisiness, and (d) Inharmonicity. Shape/Aesthetics is the shape of the scent, such as linear, sharp or round liquid. Shape/Aesthetics may be translated to the sound properties (a) Perceptual Spectral Centroid, (b) Sharpness, (c) Spectral Flatness, and (d) Harmonic Energy. The input processor 130*a* outputs sound through the sound output device 220 based upon the sound properties that are translated based upon the scent properties.

Recipe Table, below, illustrates a formulation for two products, PROD_A, and PROD_B, in an embodiment of the invention. The formulation may be provided as input data as described throughout this disclosure. Each of the INGR_1, INGR_2, etc., illustrate the percentage of each ingredient (or scent) 150*b* ("Ingredient Percentage") of the total weight of PROD_A and PROD_B. Alternatively, Ingredient Percentage may be provided as percentage of volume. Each product may contain as many ingredients as needed or desired by a user. Perfumes, for example, commonly contain between 5 and 60 ingredients, but the number of ingredients may be lower or higher. Other products such as shampoos, beverages, and other, may contain a different number of ingredients.

RECIPE TABLE

| Product Name | INGR_1 | INGR_2 | INGR_3 | INGR_4 | INGR_5 | . . . | INGR_N |
|---|---|---|---|---|---|---|---|
| PROD_A | 3.932% | 1.878% | 0.333% | 1.100% | 3.000% | . . . | A_N % |
| PROD_B | 0.150% | 0.150% | 1.995% | 0.210% | — | . . . | B_N % |

Figure 14:
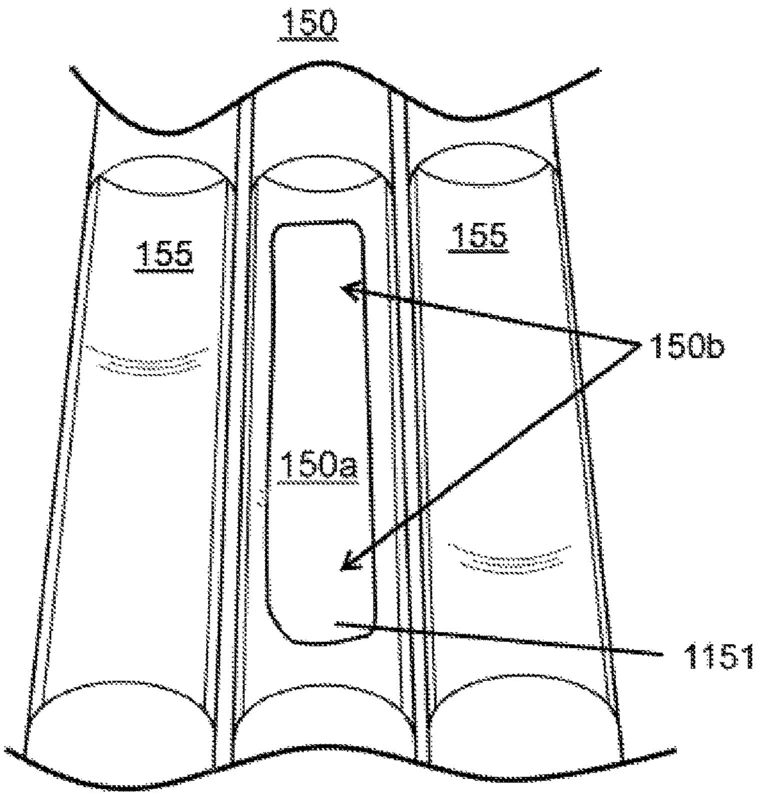
FIG. 14 is a partial view of an embodiment of the present invention.

In one embodiment of the invention, as illustrated in FIG. 14, the dispenser 150 may be a rigid container (e.g., metal, glass, plastic, etc., or combination thereof), vacuum flexible containers (bags) 150*a*, or a vacuum flexible container 150*a* within a rigid container. The vacuum flexible containers 150*a* aid in preventing vaporization and/or oxidizing of the scents. The vacuum flexible containers 150*a* may hang in the rigid container, and are easily exchangeable due to its hydraulic connectors, valves and stopcocks. The dispensers 150 can be outfitted with output devices such as displays to bestow a wide array of information to the users. This may include, but is not limited to, user-information, scent-information, machine status-information, audio-visuals, (scannable) graphics, etc.

Figure 11:
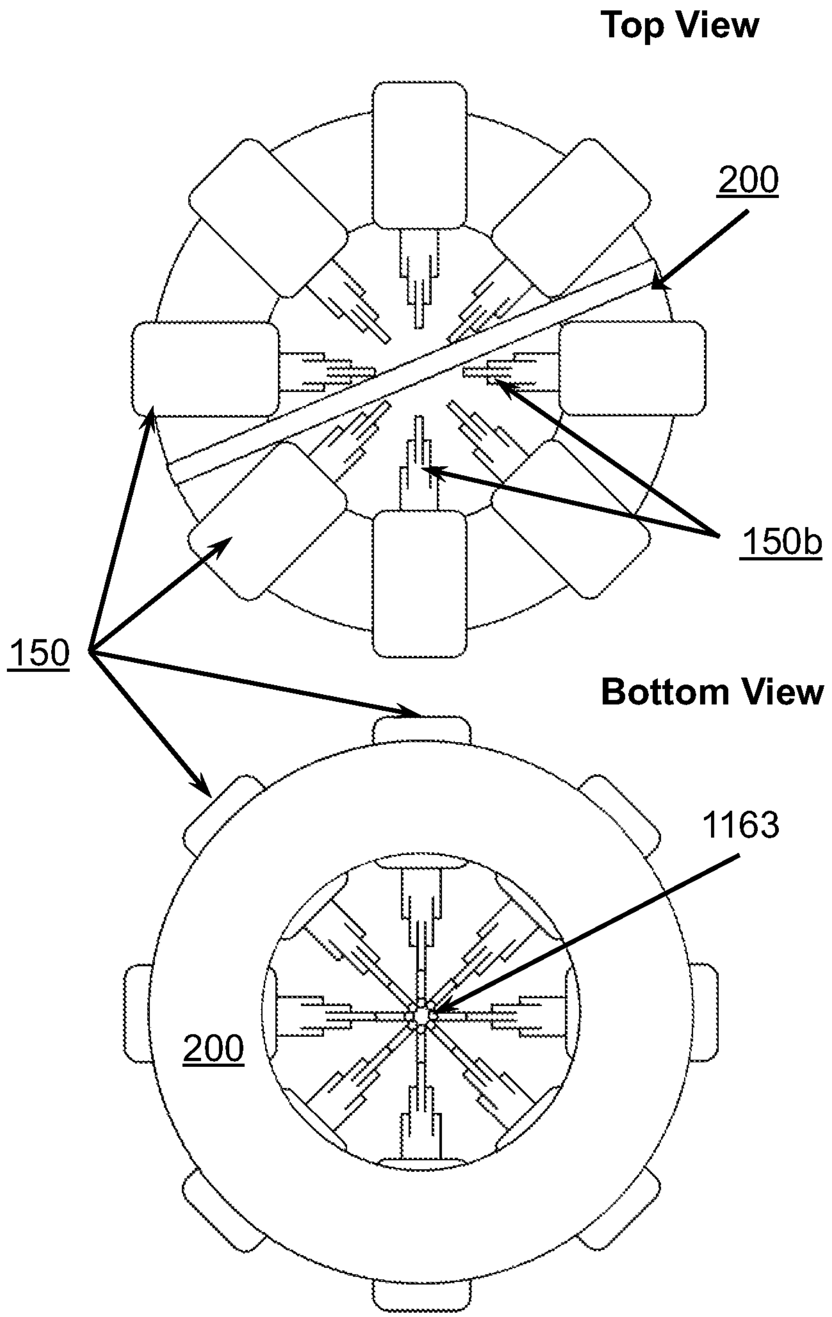
FIG. 11 is a partial view of an embodiment of the present invention.
Figure 24:
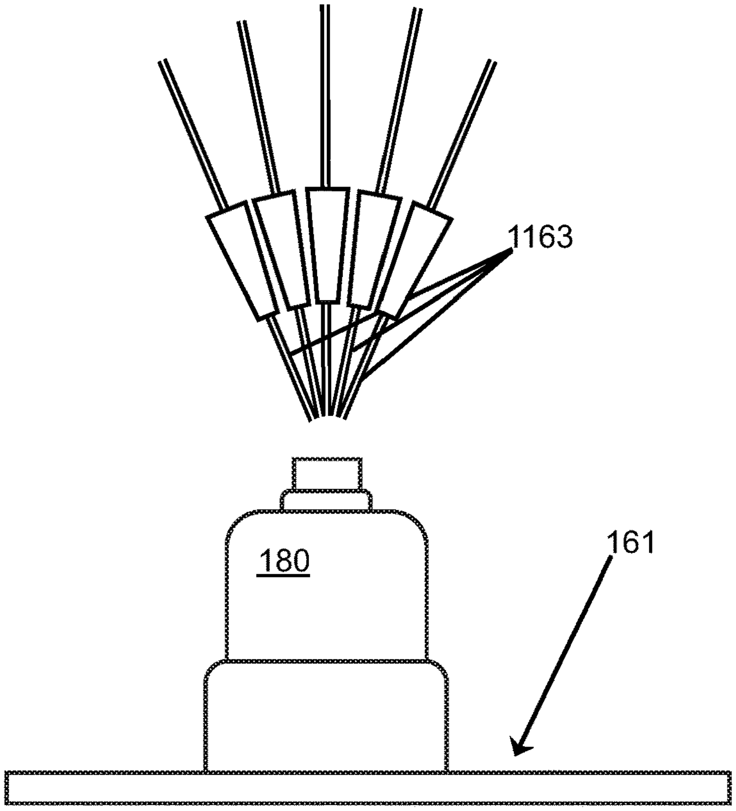
FIG. 24 is a partial view of an embodiment of the present invention

In one embodiment of the invention, as illustrated in FIGS. 11 and 24, a dispenser manifold 200 may be configured as eight dispensers 150 in a circular pattern on the dispenser manifold 200. The dispenser needles 1163 may be bent to a 90° angle, and the needle 1163 tips join in a circular pattern below the center of the manifold 200. This allows for a plurality of dispensers 150 to be used at the same time, quickening the dispense time. This is a representative embodiment with eight dispensers in a circular pattern, and the scope of the invention is not limited to this embodiment. For example, there may a smaller or larger number of dispensers in a different pattern (e.g., four dispensers in a square pattern) or the needles 1163 may not be bent or maybe bent or curved at an angle smaller or larger than 90° degrees. Needles 1163 may be any dispensing needle, nozzle, tubing, valve, faucet or other device that allows the dispensing the type of ingredients **150*b* used, with the desired accuracy, precision, or flow characteristics (e.g., high/slow speed, atomizing, spray, etc.). Needles 1163** preferably have an internal diameter ranging from 0.05 millimeters to 70 millimeters.

Figure 9:
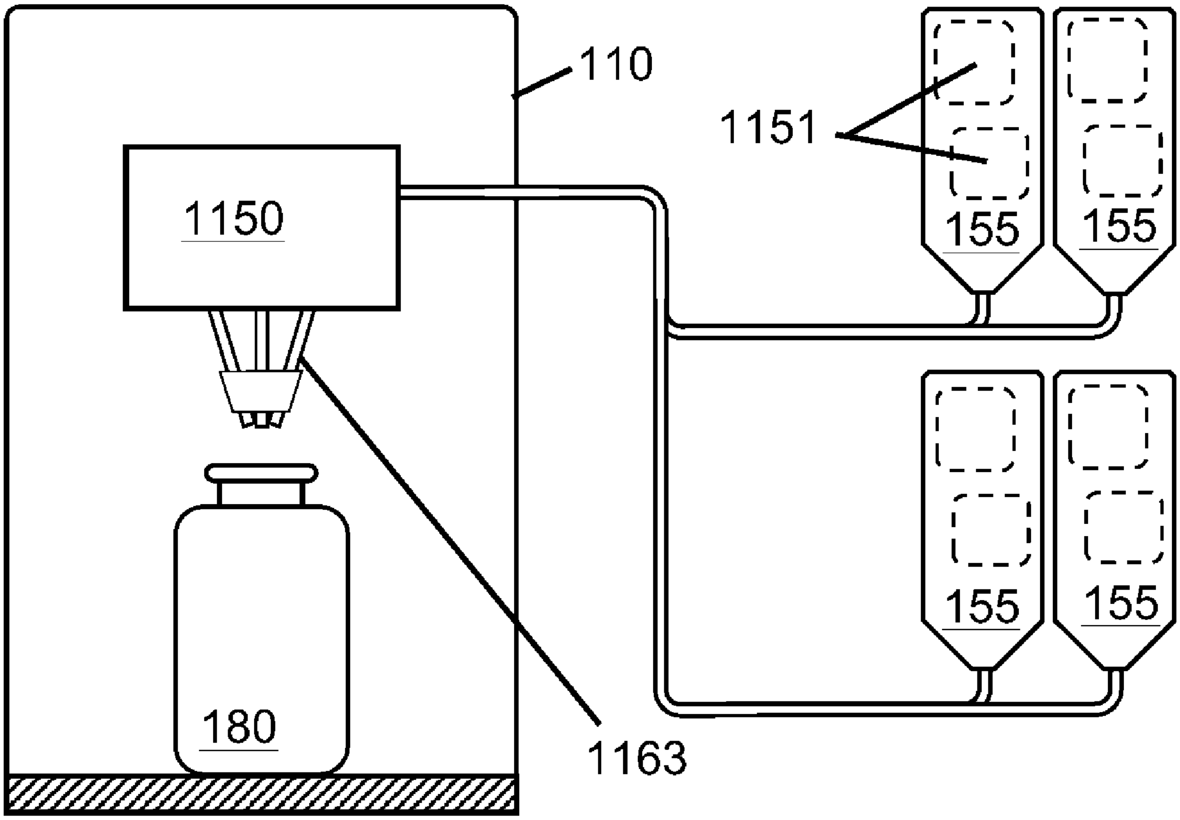
FIG. 9 is a diagram of an embodiment of the present invention.

In another embodiment of the invention, illustrated in FIG. 9, the Scent Dispenser 150 may comprise a plurality of vessels 1151, each containing an ingredient **150*b*, in fluid communication with Dosing Station 1150. Dosing Station 1150 may be attached to frame 110. Vessel 1151 may be a vacuum flexible container 150*a*, or maybe another type of container that is rigid, or that is not kept under vacuum. Vessels 1151 may be contained within an Ingredient Storage Compartment 155, as shown in FIGS. 14, 15, and may be secured to Ingredient Rack 156** with hooks, screws, crimps, or other means.

Figure 15:
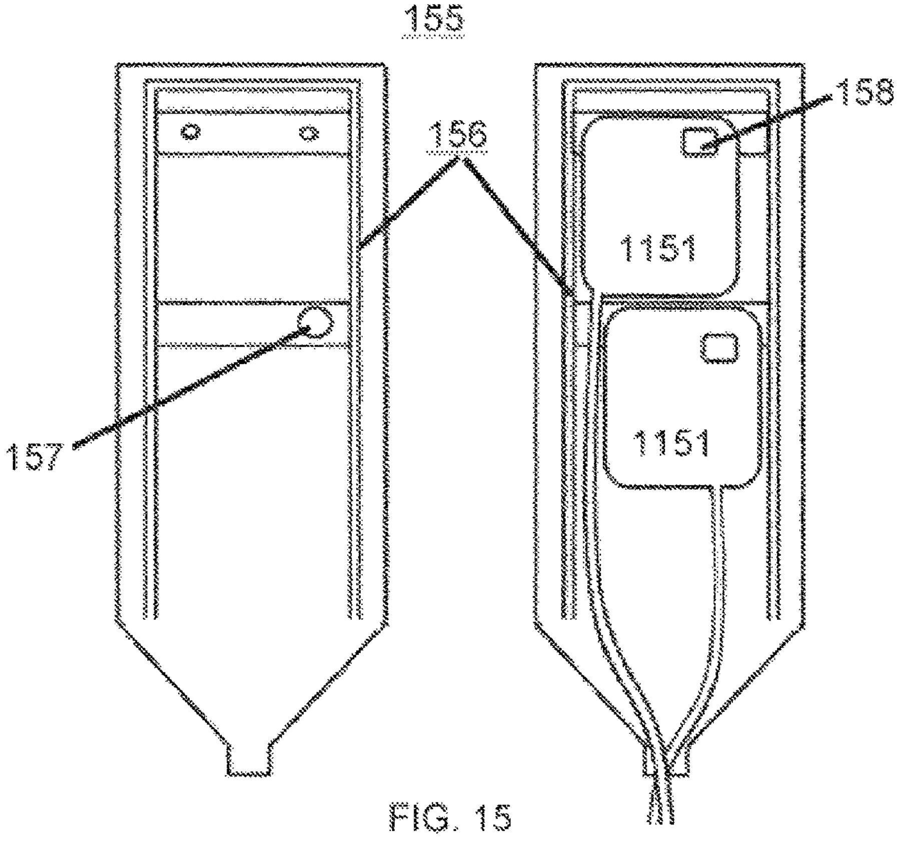
FIG. 15 is a partial drawing of an embodiment of the present invention

As shown in FIG. 15, Vessels 1151 may comprise an ID Tag 158, in the form of electronic chips (e.g., RFID tags, NFC, etc.), bar codes, colored shapes, alphanumeric characters (e.g., string, code, plain text, etc.), and various other forms of identification known in the industry. ID Tag 158 may comprise information about the scent **150*b* contained in vessel 1151, such as type of scent, production date, origin, manufacturer, batch number, concentration of scent 150*b*, identification of other ingredients mixed with scent 150*b* (e.g., alcohol, base liquid, multiple pure ingredients, etc.), and various other information. ID Tag 158 may also comprise information about the Vessel 1151, such as type, material, production date, what scent must be stored in vessel 1151**, how many times the Vessel has been used, and various other information. Information in the ID Tag allows tracking and identifying with high precision specific batches of scent that were used to fill a particular container. This has many applications, such as increasing product safety, facilitating of defect tracking and removal, and various other benefits.

In one embodiment Vessels 1151 are bags **150*a* that can vary in size from 100 m1-2.5 L. In some embodiments, the size of vessels 1151 may be smaller or larger. Preferably, Bags 150*a* may be made of Ethylene tetrafluoroethylene (ETFE), which is chemically inert (e.g., reduces risk of imparting smell or residue on scent 150*b*); resistant to chemicals, electricity, and high-energy radiation; self-cleaning (due to its nonstick surface); flexible, fully collapsible (to, e.g., avoid mixing with air or other materials, enabling full discharge of ingredient and reduce losses); and recyclable. Many ETFE characteristics are maintained over a wide temperature range, which may be helpful when storing varying ingredients (e.g., with varying corrosive properties) in environments that may vary in temperature (e.g., long term cold or cold storage, dispensing at higher temperatures). Materials other than ETFE may also be used for Bags 150*a*** depending on the characteristic of the ingredients, the overall system, cost, and other factors.

Scent Dispenser 150 may also comprise a display which may display any information for the user, including information about scents, formulations, state of dispensing, and any other information. Scent Dispenser 150 may also comprise input receiver 122. Scent Dispenser 150 may also comprise indicators in the form of lights or sound to indicate state of dispensing, alarms, errors, notifications, and other information.

Ingredient Storage Compartment 155 can be outfitted with output devices such as displays to bestow a wide array of information to the users. This may include, but is not limited to, user-information, scent-information, machine status-information, audio-visuals, (scannable) graphics, etc. Ingredient Storage Compartment 155 may be attached to frame 110, or may be located in a different location. Ingredient Storage Compartment 155 and Ingredient Rack 156 may be made from any suitable material, and they maybe separate structures, or the Ingredient Storage Compartment 155 may consist solely of Ingredient Rack 156.

A Reader 157 may be provided on the Ingredient Storage Compartment 155, on the Ingredient Rack 156, or both to obtain information from the ID Tag 158 on Vessel 1151. Reader 157 maybe a RFID Reader, bar code scanner, scanner capable of character recognition, OCR device, or any other type of reader or sensor capable of acquiring the information contained in the ID Tag 158.

Figure 17:
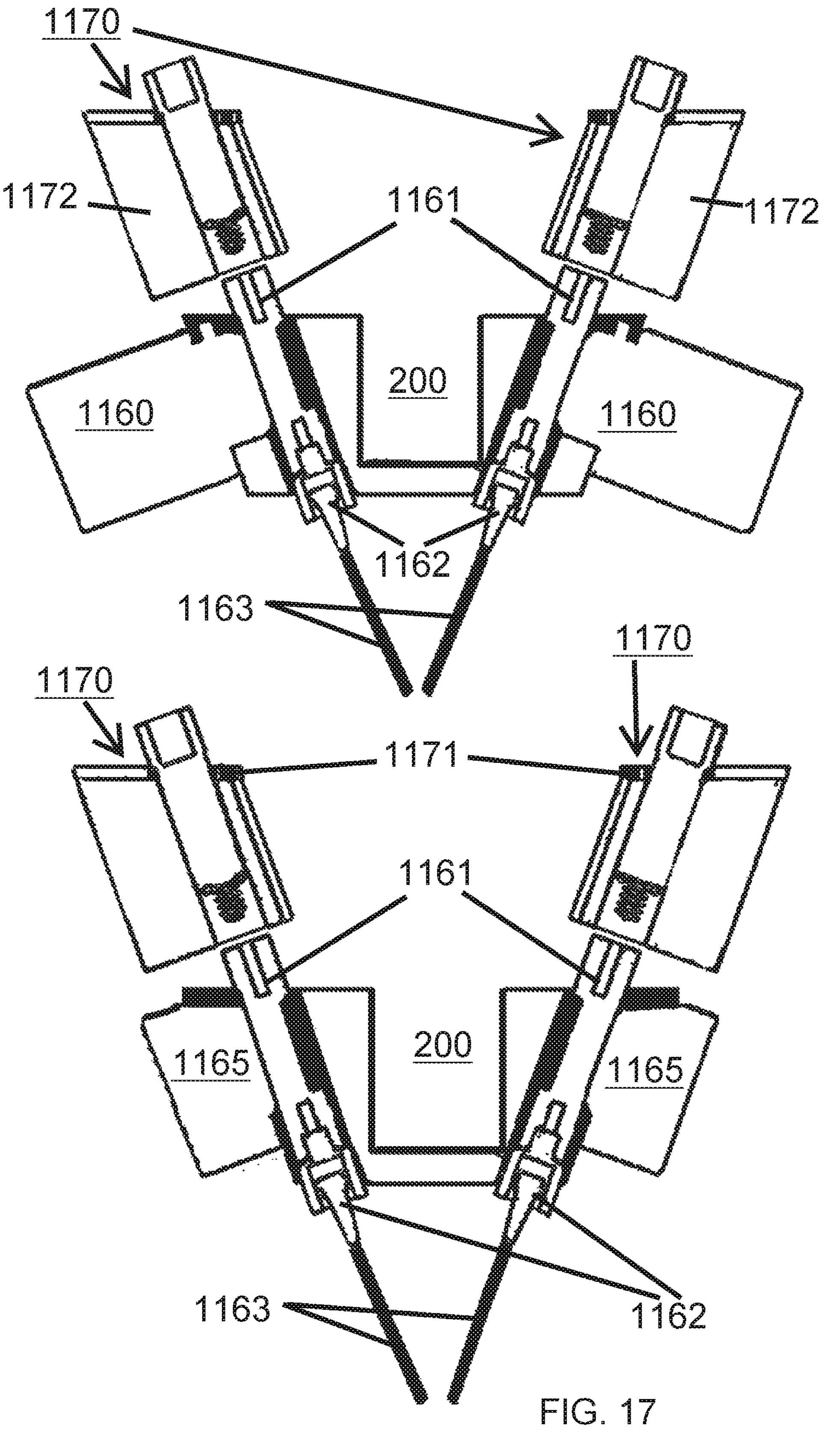
FIG. 17 is a partial drawing of embodiments of the present invention
Figure 25:
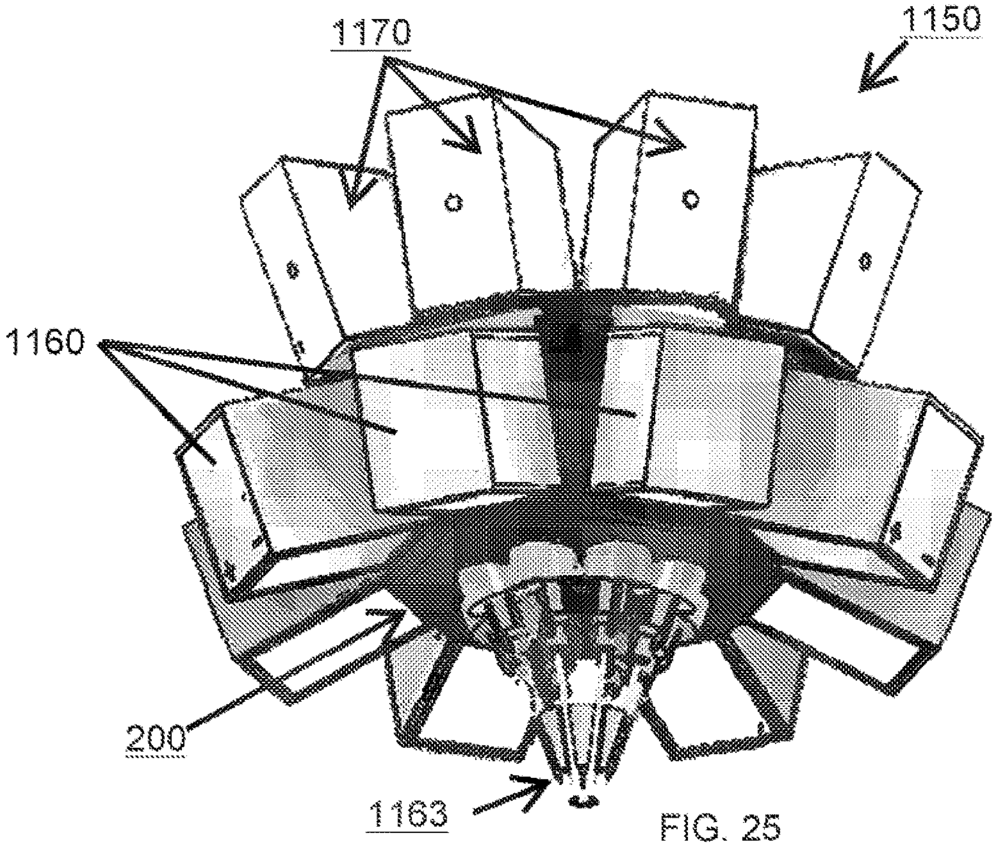
FIG. 25 is a partial view of an embodiment of the present invention

As shown on FIG. 17 and FIG. 25, Dosing station 1150 may comprise a manifold 200 configured to receive a plurality of dosing controllers, which maybe pumps 1160, valves 1165, or any other device that can be configured to dispense an amount of scent required for a particular formulation. Each dosing controller is in fluid communication with a Vessel 1151 through a dosing controller inlet. Each dosing controller is configured to dispense the ingredient **150*b* contained in Vessel 1151 into container 180 through a dosing controller outlet. In different embodiments each dosing controller may be in fluid communication with one or more Vessels 1151, or one or more Vessels 1151 may be connected to one dosing controller 1160, 1165, or multiple dosing controllers may dispense the same scent 150*b*. Dosing station 1150 may further comprise a filling platform 1159 for supporting the container 180 so that the opening of container 180 is positioned to receive ingredients 150*b* from dosing controller outlet. Dosing station 1150 may further comprise a sensor for detecting if container 180 is properly positioned on the filling platform 1159**.

In one embodiment Dosing station 1150 comprises a manifold 200 configured to receive a plurality of dosing controllers that comprise pumps 1160, and needles 1163 for dispensing ingredient **150*b* into container 180. The manifold 200 is configured in such a way so as to position the plurality of pumps at an angle with the pump outlet pointing downward and toward a filling platform. The needles (1163 of the plurality of pumps can be configured (e.g., by varying their length, by curving them, bending them, etc.) so that all needles 1163 meet just above the opening of the container 180, and form a circle with circumference smaller than the opening of container 180. Such configuration of the Manifold 200, plurality of pumps 1160, and needles 1163 allows multiple pumps to be positioned at the same dosing station allowing multiple scents to be dispensed simultaneously into container 180. For example, by varying the size of the manifold 200, the angle at which it receives the plurality of pumps 1160, and the length and bend of needles 1163, Dosing Station 1150 may comprise higher or lower number of pumps 1160 permitting more or less scents to be mixed simultaneously at one Dosing Station 1150**.

Each of the plurality of pumps 1160 may be configured to deliver a predetermined amount of scent 150*b* per pump stroke, or per time pumping (e.g., per 100 milliseconds). To dispense an amount of scent determined by input processor 130*a* for a formulation, the pump dispensing that scent will be pumped for as many strokes, or for as long as, required to deliver the amount of scent. In a preferred embodiment Ingredient 150*b* enters through pump inlet 1161 and with each stroke of pump 1160 a predetermined amount of ingredient 150*b* travels from pump inlet 1161 to pump outlet 1162 and through needle 1163 and is delivered to bottle 180. In one embodiment, the Dosing Station 1150 comprises diaphragm pumps with a nominal stroke volume of 15 microliters which dispenses 15 microliters of scent 150*b* from Vessel 1151 into container 180. In other embodiments, and with different ingredients, particularly when larger volumes are required, such as with cosmetics, shampoos, soft drinks, etc., a different dispensing volume per pump stroke may be desirable.

In one embodiment of the invention Dosing Station 1150 comprises a heating system 1170. Heating System 1170 maintains the temperature of ingredient 150*b* at a predetermined dispensing temperate Td ensuring proper viscosity of Ingredient 150*b*, consistent flow per pump stroke, and consistent volume of 150*b* being dispensed with each stroke of pump 1160. In a preferred embodiment it has been found setting the dispensing Temperature Td in the range of 30 C-35 C, and preferably approximately 35 C has resulted in flowrate precision of around 0.1%. Heating System 1170 may comprise a heating element 1171, a heating block 1172 surrounding the pump inlet. Heating element 1171 heats heating block 1172 which is configured to transfer heat to pump inlet, and/or the pump. The heating block 1172 preferably is made of heat conduction materials, such as aluminum. Heating element 1171 maybe resistive heating element, it may be Infrared or other radiated heating elements, or it may be tubing circulating heated fluid. The heating system 1170 may regulate and maintain the dispensing temperature using temperature sensors, processors (e.g., 130*a* or others) implementing temperature control algorithms, and other hardware and software components.

In one embodiment of the invention the Ingredient Storage Compartment 155 is pressurized and configured to apply pressure on the flexible containers 150*a*. In this embodiment the pressure within Ingredient Storage Compartment 155 may be used to force the contents of flexible containers 150*a* to flow towards Dosing Stations 1150 and into container 180 without the need for pumps 1160. Ingredient Storage Compartment 155 may comprise a pressure sensor that together with a control system and an air compressor is configured to maintain the tank pressurized to maintain consistent flow.

In one embodiment of the invention the plurality of dosing controllers comprises valves 1165 instead of pumps 1160. The valves are calibrated so that the volume of each ingredient is known for a unit of time during which the valve is open (e.g., 100 milliseconds). The valve can be held open for a specific amount of time to dispense a desired amount of ingredient 150*b* pass through the inlet, outlet, needles 1163 and into the bottle 180.

In an embodiment where the Ingredient Percentage is provided as weight percentage of each ingredient 150*b*, the weight of each ingredient ("Wt.") to be dispensed is calculated based on the weight percentage and the desired weight of a recipe. Dosing controllers 1160, 1165, are calibrated to deliver consistent amount of ingredient 150*b* with each stroke of pump 1160, or for each unit of time pump 1160 is pumping, or for each unit of time valve 1165 is open. The calibration data is stored in a calibration table, example of which is provided in following Table.

| | INGR_1 | | INGR_2 | |
|---|---|---|---|---|
| Wt (g.) | ρ (g/cc) | v (ml.) | ρ (g/cc) | v (ml.) |
| 0.01 | 0.82 | 0.012 | 0.846 | 0.012 |
| 0.02 | 0.82 | 0.024 | 0.846 | 0.024 |
| | | . . . | | |
| 0.07 | 0.82 | 0.085 | 0.846 | 0.083 |
| | | . . . | | |
| 0.10 | 0.82 | 0.122 | 0.846 | 0.118 |

Figure 23:
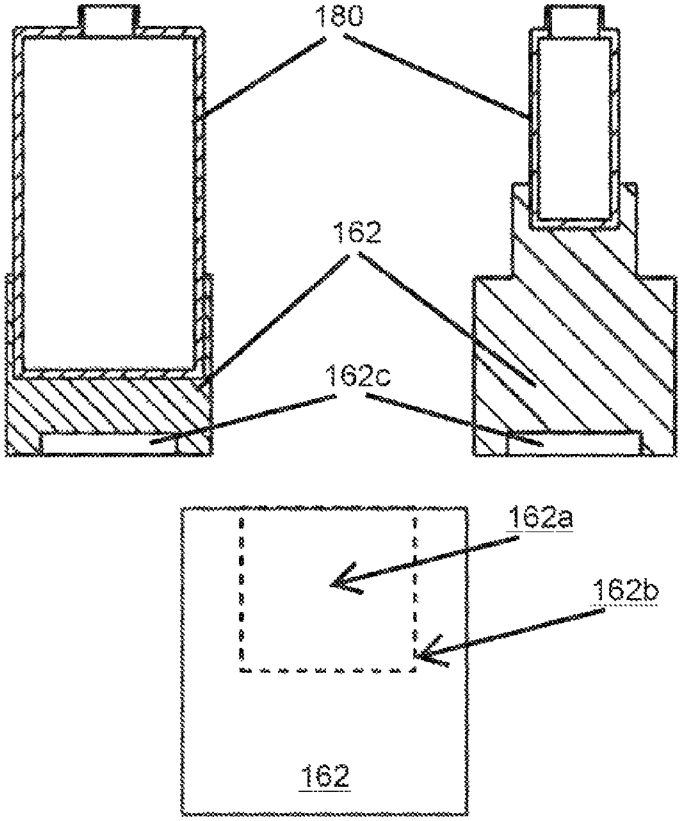
FIG. 23 is a drawing of container and puck in an embodiment of the present invention

The table above, represents an example of a calibration table for two ingredients, INGR_1, and INGR_2. In the table, Wt. is the mass of the ingredient to be dispensed in grams ("g"), p (rho) indicates the density of the ingredient in grams per cubic centimeter ("g/cc") at the dispensing temperature (Td), and v is the volume in milliliters (ml) of the ingredient that corresponds to the desired weight (Wt.) to be dispensed. By identifying, for example, from ID Tag 158, ingredient 150*b* (including, e.g., pure ingredient, mixtures of pure ingredients, base liquid, and combinations thereof) contained in each Vessel 1151, its concentration and weight in the recipe, and based on that that information determining the needed volume using the Calibration Table, a system according to the present invention can determine the valve opening or pumping duration time, or number of pump strokes necessary to dispense the proper amount of ingredients 150*b*. Alternatively, the volume can be determined using a formula that correlated the weight and density, for example: $v=Wt./\rho$ The pucks 162 can be molded to any shape to hold any shape of container 180 within its boundaries and allows the use of containers 180 of varying sizes on the same system according to this invention. Pucks 162 used in a system according to this invention preferably have the same outer size, such that the pucks can move along dispenser lane 161. As illustrated in FIG. 23, puck 162 comprises an aperture 162*a* for placing a container 180. Aperture 162*a* does not go all the way through the puck 162. The depth 162*b* of aperture 162*a* is determined by the height of container 180 used. This allows containers with varying heights to be transported using pucks 162 with an aperture 162*b* such that the openings of containers 180 will be at the same height regardless of the height of each container 180. For example, this ensure that when containers of various heights are placed with the appropriate puck 162 on filling platform 1159 the opening of the container will always be at the same height below the dosing controller outlet. The shape and size (e.g., width, diameter, etc.) of the cross section of aperture 162 may vary according to the size and shape of the container 180 used in the system according to this invention, thus enabling the use of containers 180 with different cross sections shapes and/or sizes. Puck 162 may comprise a weight 162*c*, for example to increase stability when using small bottles that may need to be elevated thus also elevating the center of gravity and increasing the risk of tipping, and for various other reasons. Pucks 162 maybe produced from any suitable material or combination of materials.

Puck 162 may also comprise an Puck ID 162*c* (e.g., RFID, NFC, QR, bar code, etc.), which can be used to track the progress of the container 180 in Puck 162 and can be used to confirm completion of a production order.

Figure 3:
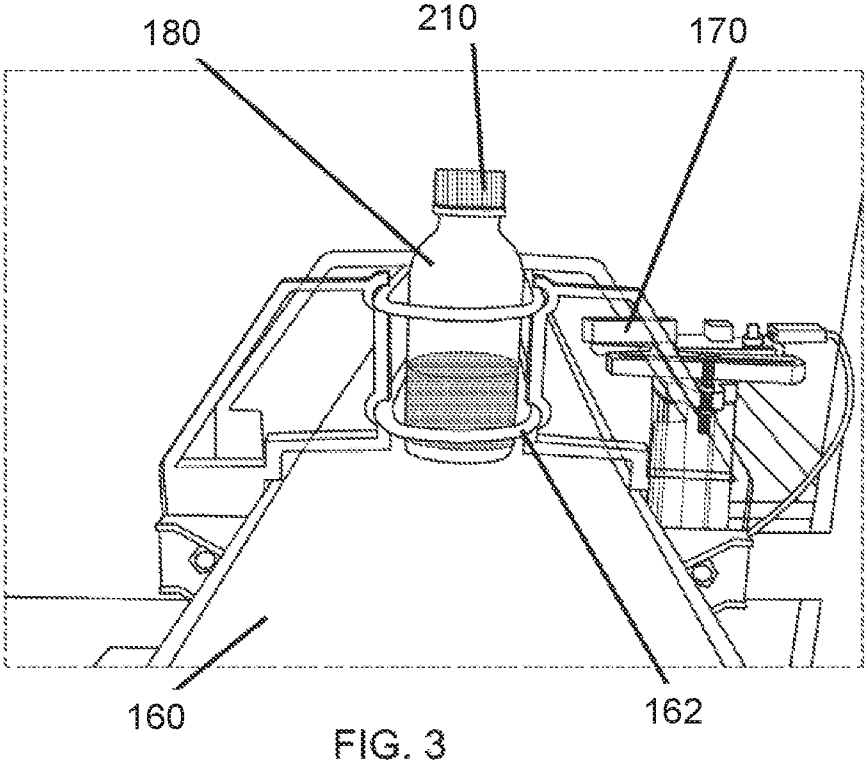
FIG. 3 is a partial view of an embodiment of the present invention.

In one embodiment of the invention a capping system 205, illustrated in FIGS. 28-31, may be used that may account for different sizes and shapes of caps 210. The cap 210 may be a mist sprayer cap with a dip tube as described above and as illustrated in FIG. 12. Alternatively, the cap 210 may be a cap without sprayer capabilities, as illustrated in FIG. 3. For example, cap 210 may comprise a cover, a sprayer, and a straw 210*a*. A capping system according to an embodiment of this invention can be used to apply caps 210 with different length straws 210*a*. Capping system 205 may comprise a frame 205*a*, cap magazine 2051, cap dispenser 2052, capping carriage 2053, capping elevator 2054, and a capping straw guide 2055. Frame 205*a* may be part of frame 110, or maybe a separate frame.

Caps 210 are placed in Cap magazine 2051. The magazine 2051 is removably attached to capping station frame 205*a* and can be removed to be refilled or replaced with a magazine 2051 that can accommodate different types of caps 210, or caps with longer or shorter straws 210*a*, or straws 210*a* with different diameter. Cap 210 advances along the magazine 2051 in the direction of cap dispenser 2052.

Cap dispenser 2052 provides a cap 210 for container 180 from magazine 2051. Cap dispenser 2052 may be a channeling gate system as shown on FIGS. 28 and 31, comprising channels 2052*a* each with a gate 2052*b*, wherein each magazine 2051 feeds caps 210 into channel 2052*a* when the respective gate 2052*b* is open, allowing a cap 210 from a desired a magazine to be delivered to capping carriage 2053, which moves laterally to receive cap 210. In another embodiment cap dispenser 2052 may be a channeling and funneling gate system as shown on FIG. 31 allowing cap 210 from a desired magazine to be delivered through channel 2052*a* through funnel 2052*c* to capping carriage 2053.

Capping carriage 2053 receives cap 210 from capping dispenser aligns it with the opening of container 180 and applies it to container 180. Capping carriage 2053 may to move vertically to deliver cap 210 to the container 180 opening, and may also reorient cap 210 (e.g., by rotating) so that straw 210*a* points vertically toward the container 180. In some embodiments Capping carriage 2053 may not move vertically or rotationally and may also comprise a capping elevator 2054 which may perform the vertical movement to deliver the cap to the container, the rotational movement to re-orient the cap, or both the vertical and rotational movement.

Figure 29:
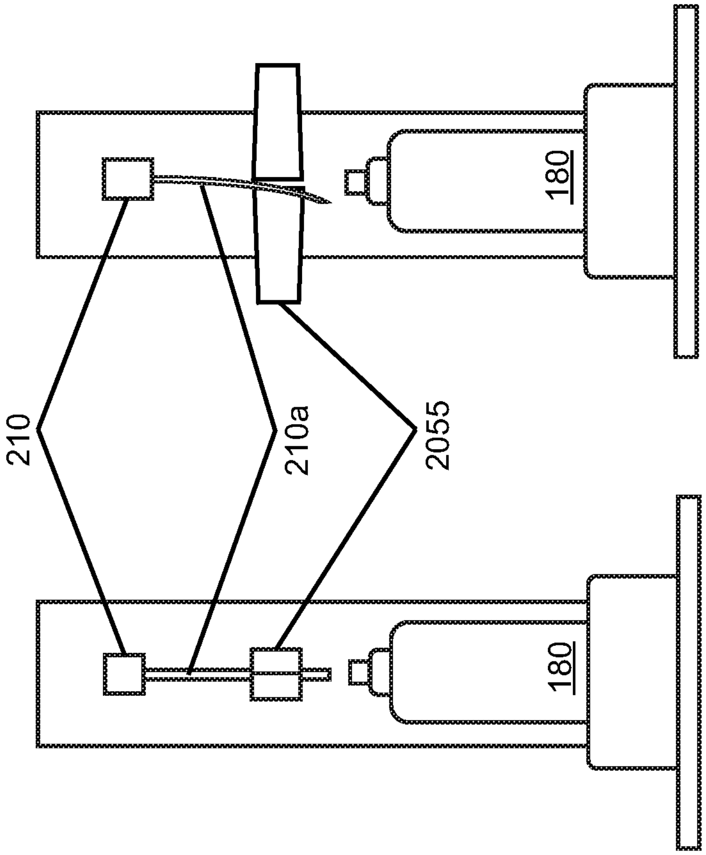
FIG. 29 is partial views of an embodiment of the present invention
Figure 31:
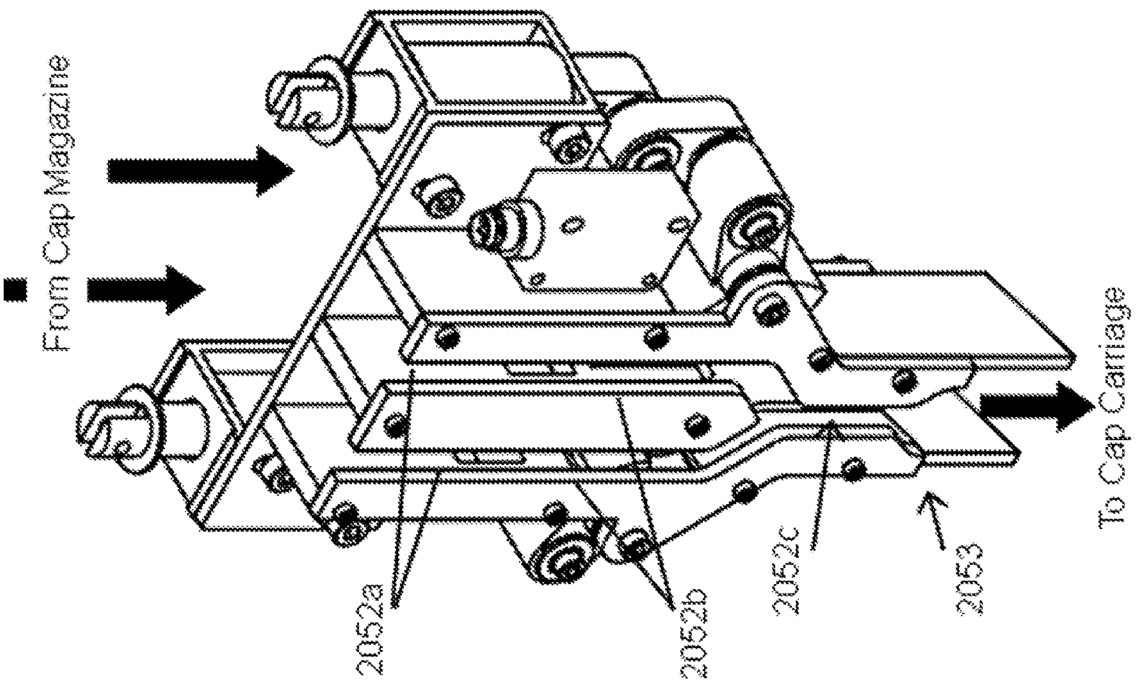
FIG. 31 is a partial view of an embodiment of the present invention
Figure 30:
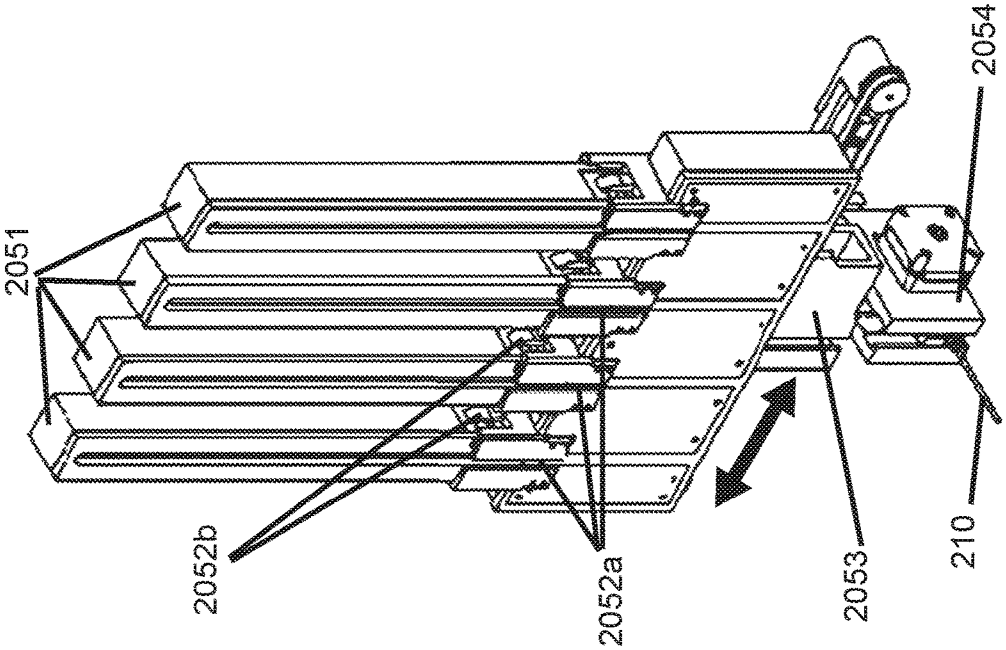
FIG. 30 is a partial view of an embodiment of the present invention

Capping system 205 may also comprise a straw guide 2055 ensure that straw 210*a* be properly placed on container 180. Straw guide 2055 is configured to be movably positioned above opening of container 180 so that the guide will "feed" the straw in the container 180 opening. Straw guide may retract to allow Cap 210 to be applied on container 180. As shown in FIG. 29, Straws 210*a* may curve outward so that when cap 210 is aligned with the opening of container 180 the bottom of straw 210*a* does not line up with the opening of the container. Straw guide 2055 can facilitate application of cap 210, especially when straw 210*a* is longer and outward curvature is larger, or when the diameter of opening of bottle 180 is small. Straw guide 2055 may be a griper arm (e.g., part of the dispenser, carriage, or a separate device) or it may be a linear guide, funnel, or any other device known in the art.

Figure 32:
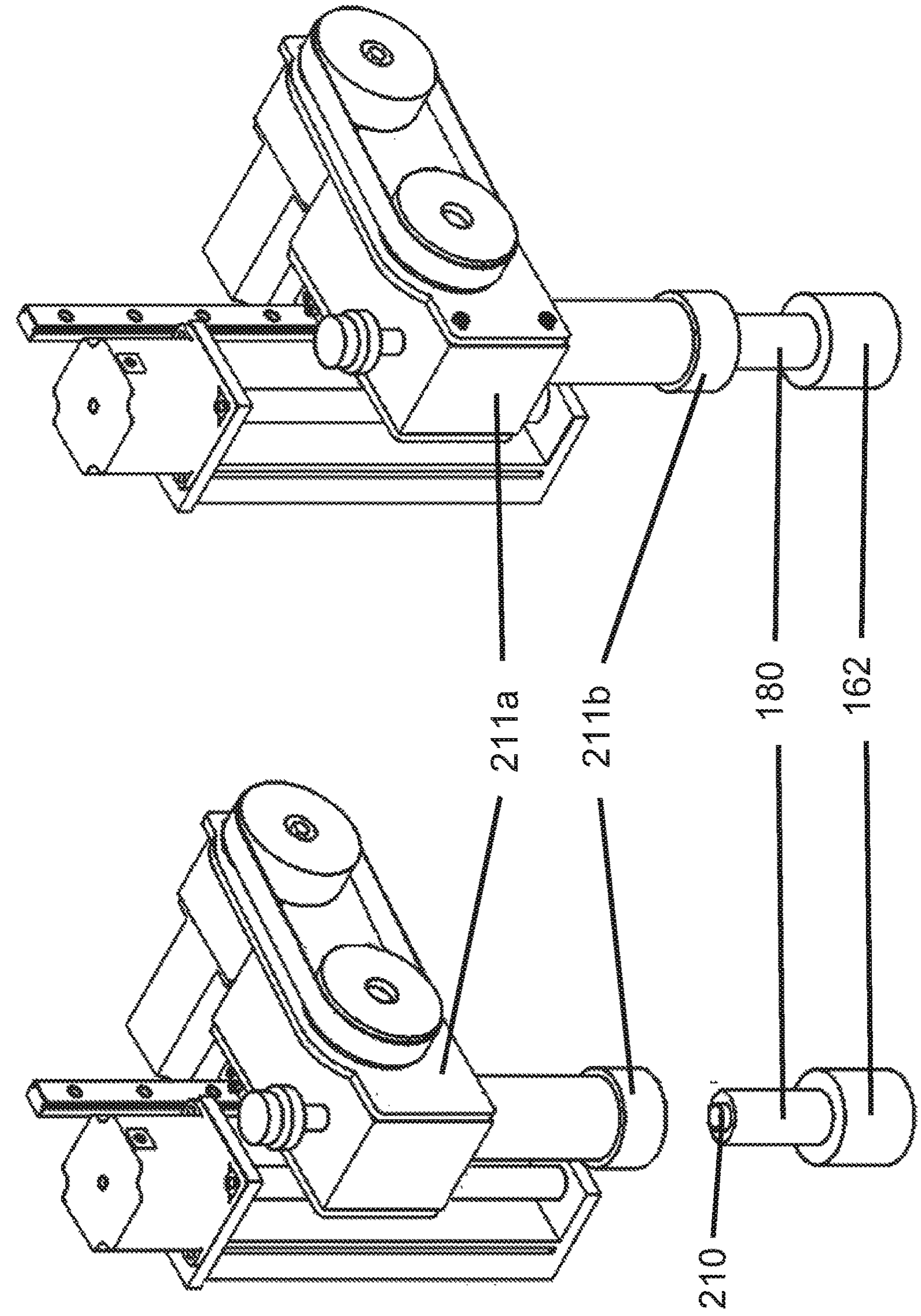
FIG. 32 is partial views of an embodiment of the present invention For clarity purposes, all reference numerals may not be included in every figure.

In one embodiment of the invention, illustrated in FIG. 32, Capping System 205 may comprise a crimping tool 211 which may be used to tighten and attach cap 210 to the container 180, for example when cap 210 is desired to be not easily removable, or if a watertight seal is desired. Crimping tool 211 may comprise a crimper elevator 211*a* and a crimper 211*b*. Crimper elevator moves the crimper 211*b* over cap 210 and crimper 211*b* affixes cap 210 on container 180 by applying pressure on the cap. In other embodiments of the invention crimper 211*b* may attach cap 210 to container 180 by rotating cap 210 to engage threads on cap 210 with threads of the opening of container 180.

Figure 16:
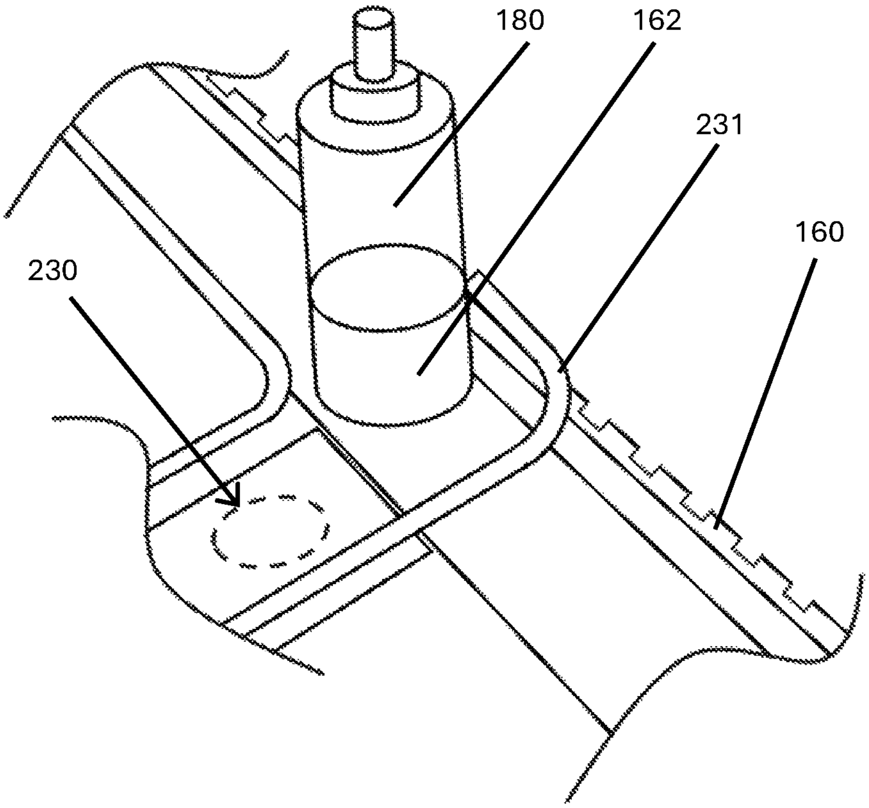
FIG. 16 is a partial view of an embodiment of the present invention

In one embodiment of the invention, a plurality of exit stations 230 are installed on the generative scent design system 100, as shown in FIG. 16. The conveyor 160 may guide the container 180 to the desired exit station 230. The exit station 230 is equipped with an actuator may remove the container 180 from the conveyor 160. The exit stations 230 may be outfitted with output devices such as displays to bestow information to the users. Exit station 230 may comprise a Puck ID reader 232 for reading the information stored on Puck ID 162*c*.

Exit station 230 may comprise a platform and a hook 231 mounted to linear guide driven by a rotating actuator. After extending the hook the conveyor 160 positions the bottle in front of the exit station. Next the exit station retracts the hook, taking the bottle away from conveyor 160.

Figure 4:
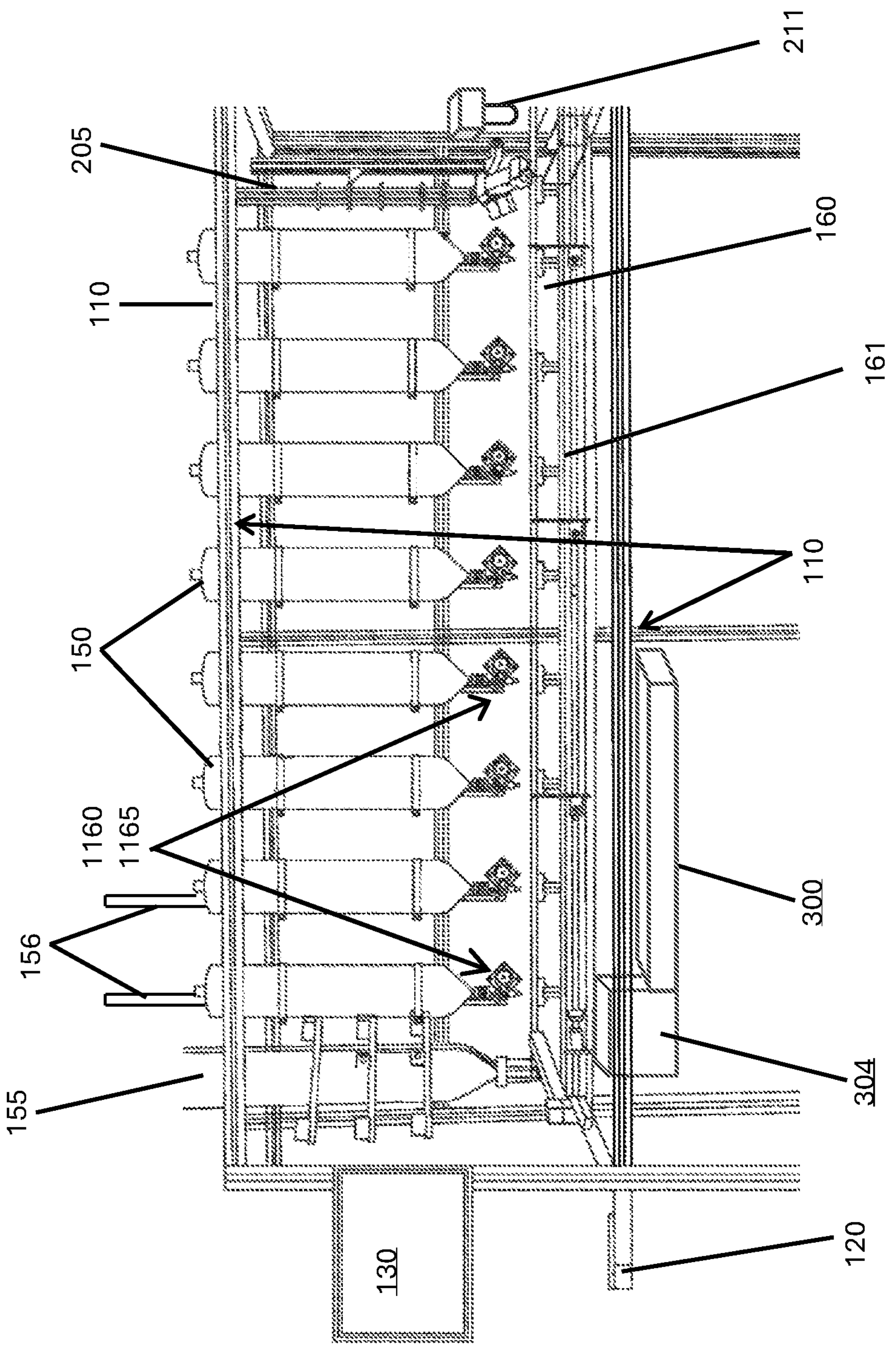
FIG. 4 is a is a view of an embodiment of the present invention
Figure 5:
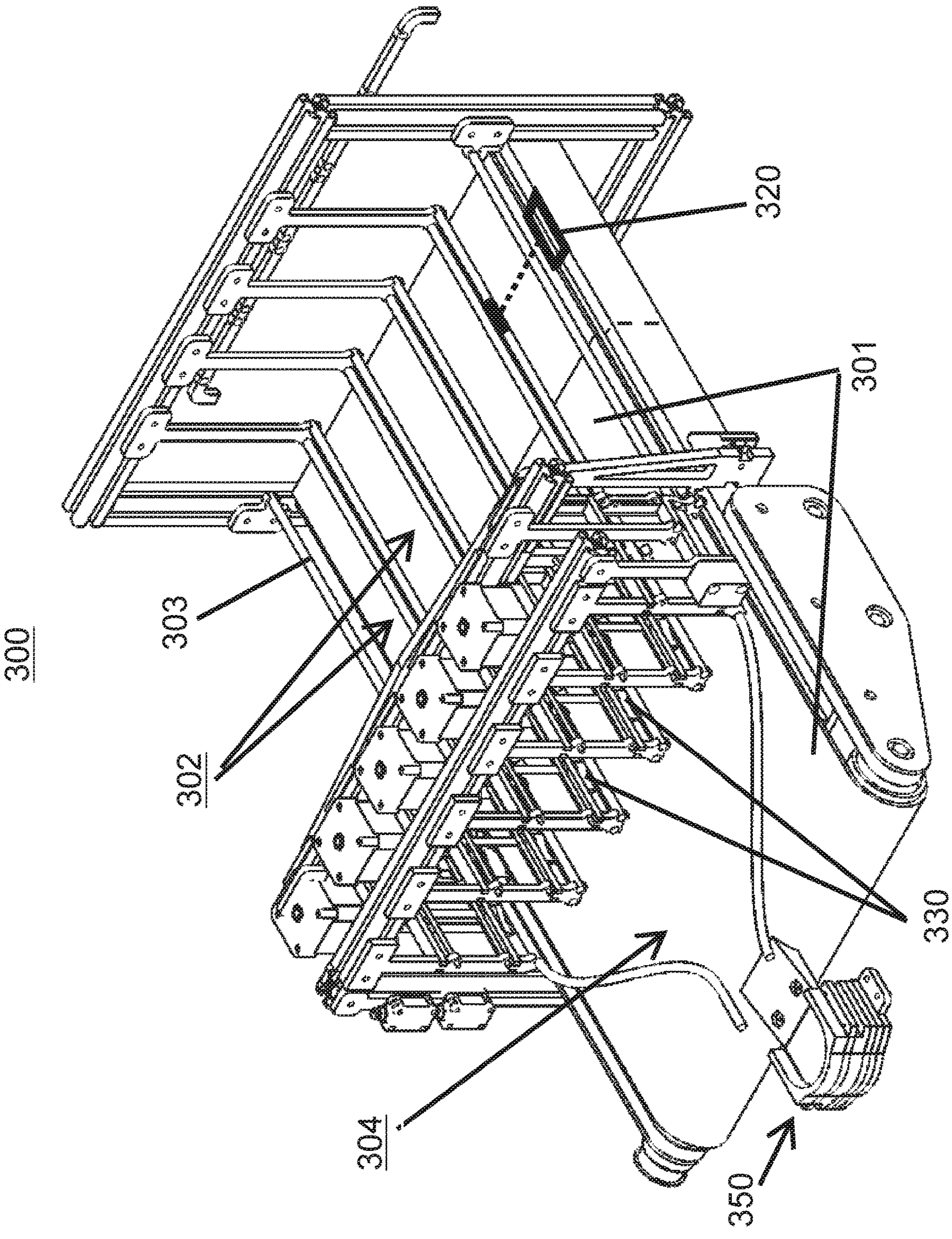
FIG. 5 is a partial view of an embodiment of the present invention
Figure 18:
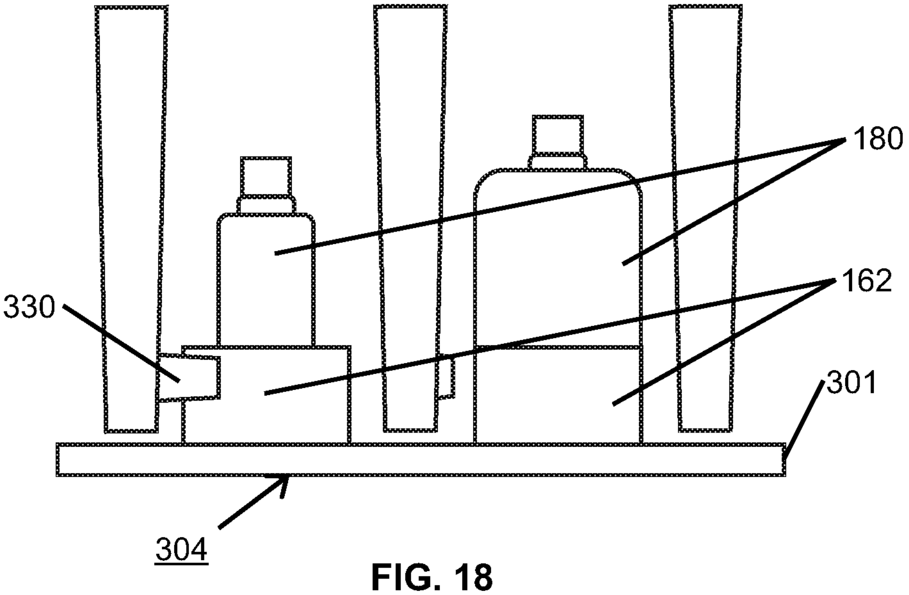
FIG. 18 is a partial view of an embodiment of the present invention

FIGS. 4, 5, 18 illustrate a container dispensing system 300 in an embodiment of the present invention comprising a supply conveyor 301, supply lane 302, supply lane separators 303, supply lane sensors 320, gates 330, supply transfer area 304, and elevator 350. Supply lane separators 303 define one or more supply lanes 302 for staging containers 180. Supply conveyor 301 may be comprised of multiple conveying mechanisms, such as conveyor belts, bead or roller conveyors, or others, such as that each supply lane comprises a dedicated conveying mechanism. In the alternative, supply conveyor 301 may comprise a single conveying mechanism whose top surface is divided into supply lanes by the supply lane dividers.

Supply lane sensors 320 may be positioned at the lanes 302 to detect the presence of a container 180 in supply lane 302. Supply sensors 320 preferably are photosensors, photo eyes, or similar photoelectric sensors comprising an emitter, receiver, and/or beam converter/reflector.

Gates 330 hold or release containers 180 and allow them to advance from conveyor 301 to the supply transfer area 304. FIG. 18 illustrates gates that may rotate to advance a container 180. When gate 330 is stationary it blocks container 180 from advancing.

Figure 19:
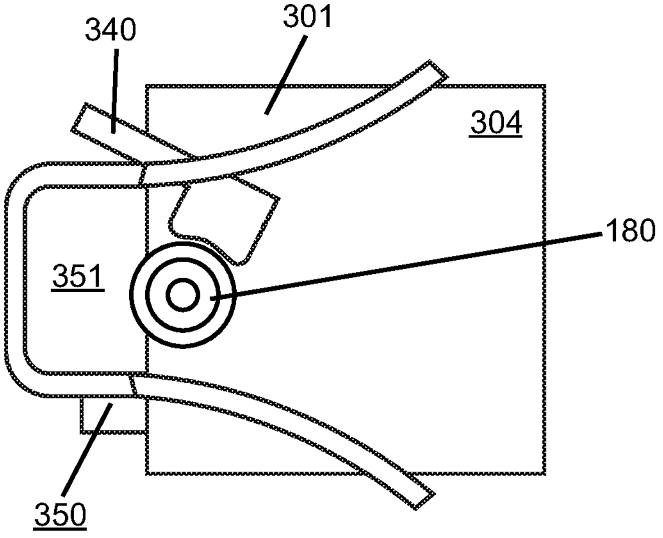
FIG. 19 is a partial view of an embodiment of the present invention

As Illustrated in FIG. 19, from the supply transfer area 304 containers 180 advance to elevator platform 351 of elevator 350. The supply transfer area 304 may be a power conveyor mechanism that transports the containers 180 onto the elevator platform 351, or the containers may advance under gravity. In one embodiment a transfer pusher 340 is provided which pushes the container 180 onto the elevator platform 351. Pusher 340 preferably comprises an arm, rotating actuator, and/or limit switches.

Figure 21:
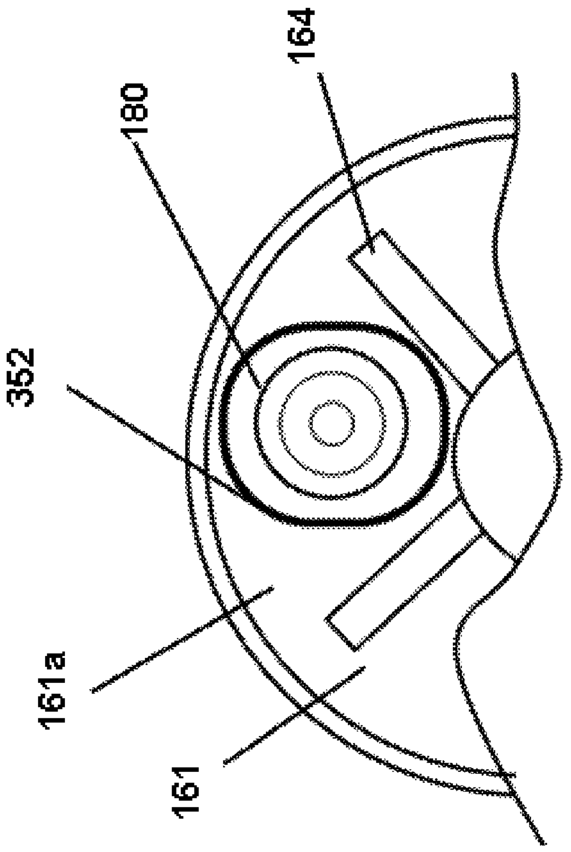
FIG. 21 is a partial view of an embodiment of the present invention
Figure 20:
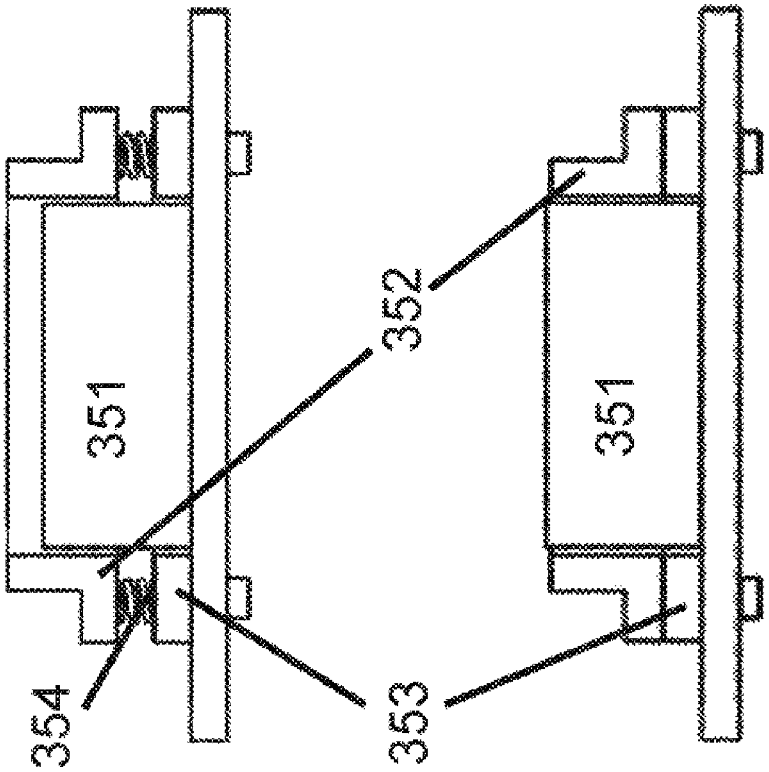
FIG. 20 is a partial drawing of an embodiment of the present invention

FIGS. 20, 21 illustrate an embodiment of elevator 350. Elevator 350 comprises elevator platform 351, platform edge 352, elevator base 353, springs 354, Elevator 350 transports container 180 to dispenser lane 161 and conveyor 160. The elevator platform 351 holds/support the pucks and is secured to the elevator base 353. The platform edge 352 is movably secured by springs 354 to base 353. Springs 354 maintain edge 352 extended above the surface of platform 351 to secure container 180 on the platform. The platform comprises an edge to make sure the bottle does not fall off when transporting or receiving a bottle. When the elevator platform is aligned with dispenser lane 161, edge 352 presses against the bottom of dispenser lane 161 compressing springs 354 and lowering edge 352 thus freeing container 180 to advance onto dispenser lane 161.

Figure 12:
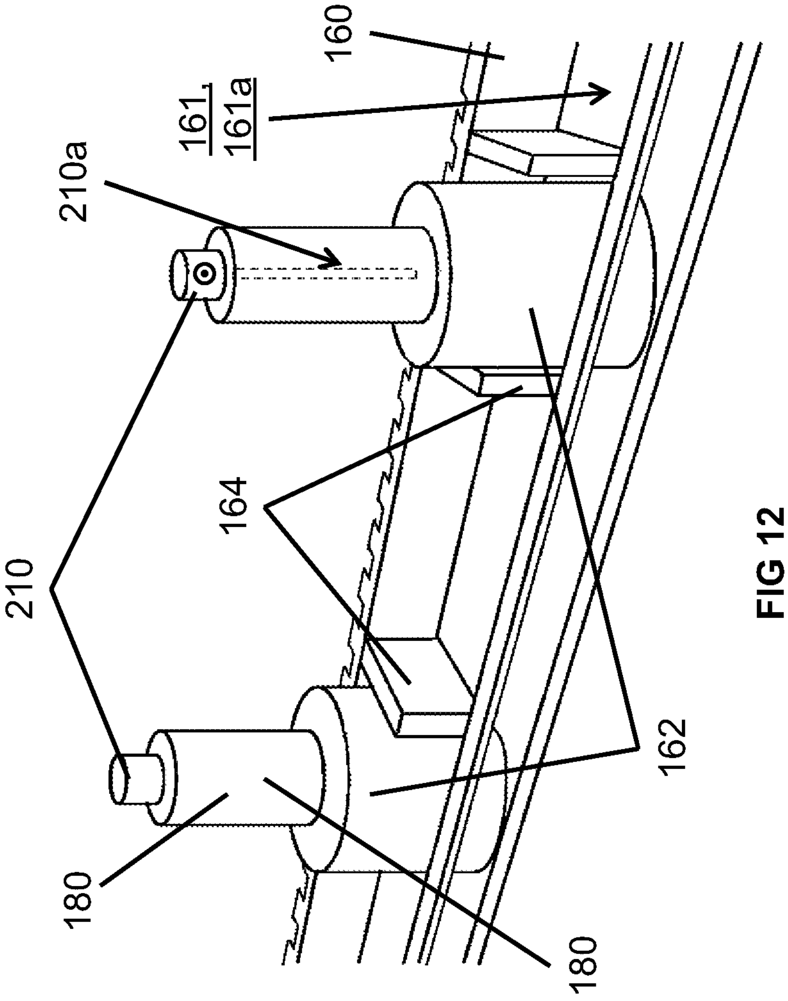
FIG. 12 is a partial view of an embodiment of the present invention.
Figure 13:
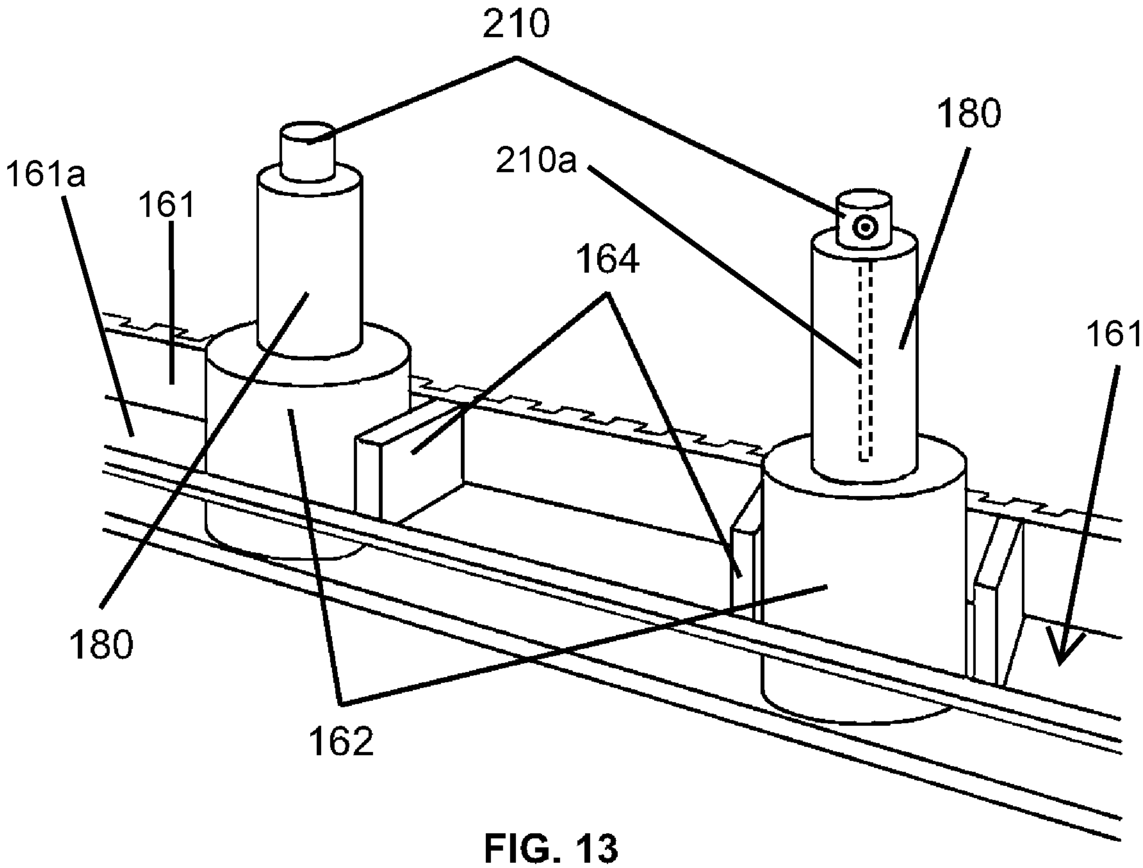
FIG. 13 is a partial view of an embodiment of the present invention.

In one embodiment of the invention, as illustrated in FIG. 12, a conveyor 160 with cleats 164 is used to retain the pucks 162 wherein the containers 180 reside. Furthermore, the cleats 164 maintain a stable increment of the position of the conveyor 160. As conveyor 160 advances, the cleats 164 transfer container 180 along surface 161*a* of dispenser lane 161. In this embodiment, dispenser lane 161 is formed between conveyor 160 and railing 161*b*. Surface 161*a* preferably is HDPE to reduce friction and facilitate the movement of the container 180 along the lance, but Surface 161*a* maybe made from any other material with low friction or can be treated with agents or product designed to reduce friction. The conveyor 160 moves the puck with container through one or more of Dosing Stations 1150, Capping Stations 205, Crimping stations 211, Labeling Stations 195, Exit Stations 230, and others.

Figure 22:
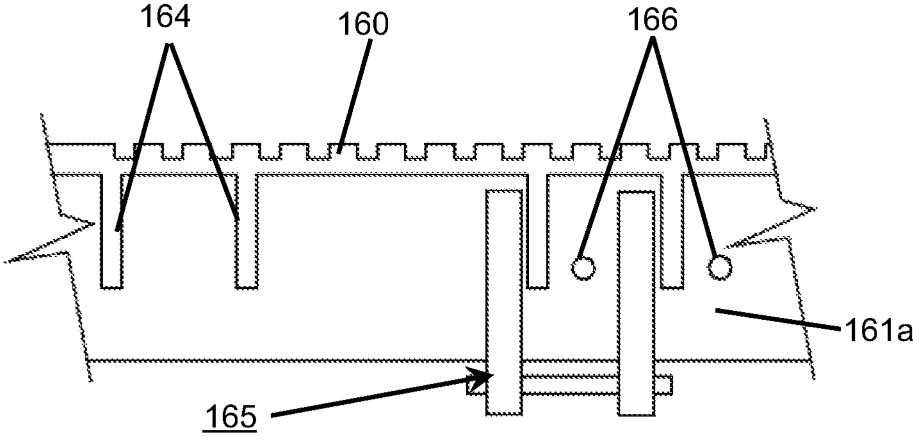
FIG. 22 is a partial view of an embodiment of the present invention

The position of conveyor 160 is detected with Sensor 165. Sensor 165 provides information to the Control System/Computer when the belt is positioned in such a way so that a bottle 180 may be located at a filling platform 1159 of one of the Dosing Stations 1150. For example, sensor 165 may be a fork style sensor assembly as shown on FIG. 22. Sensor 165 may be comprised of two sensors 166, each incorporated into the two prongs of the fork, that detect the position of the cleats. To ensure that the conveyor 160 is properly position for a container 180 to be present at a filling platform 1159, both prong sensors must detect the presence of cleats (e.g., there is a cleat aligned with each prong sensor). Sensor 165 may also be any type of sensor capable of detecting position, for example, photo-eyes, proximity sensor, switch sensors, and others.

Figure 26:
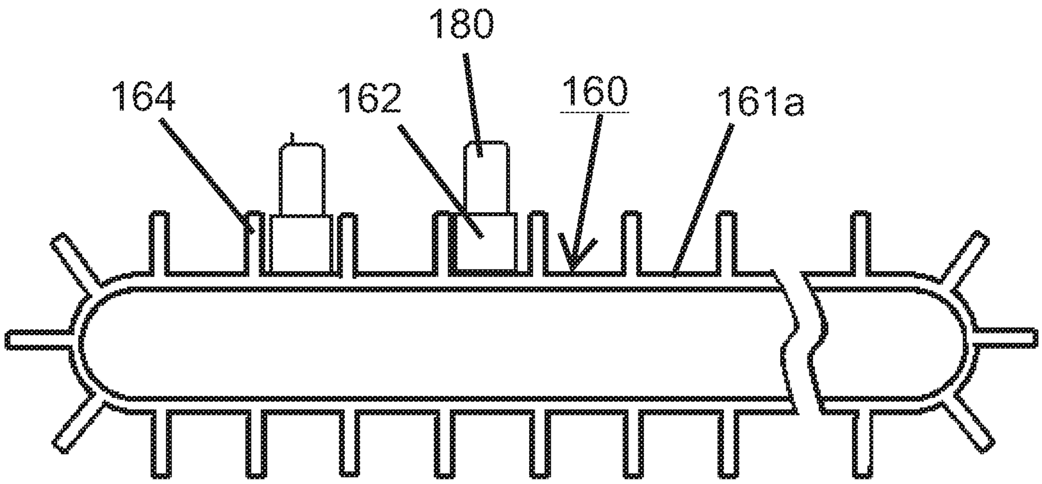
FIG. 26 is a drawing of an embodiment of the present invention
Figure 27:
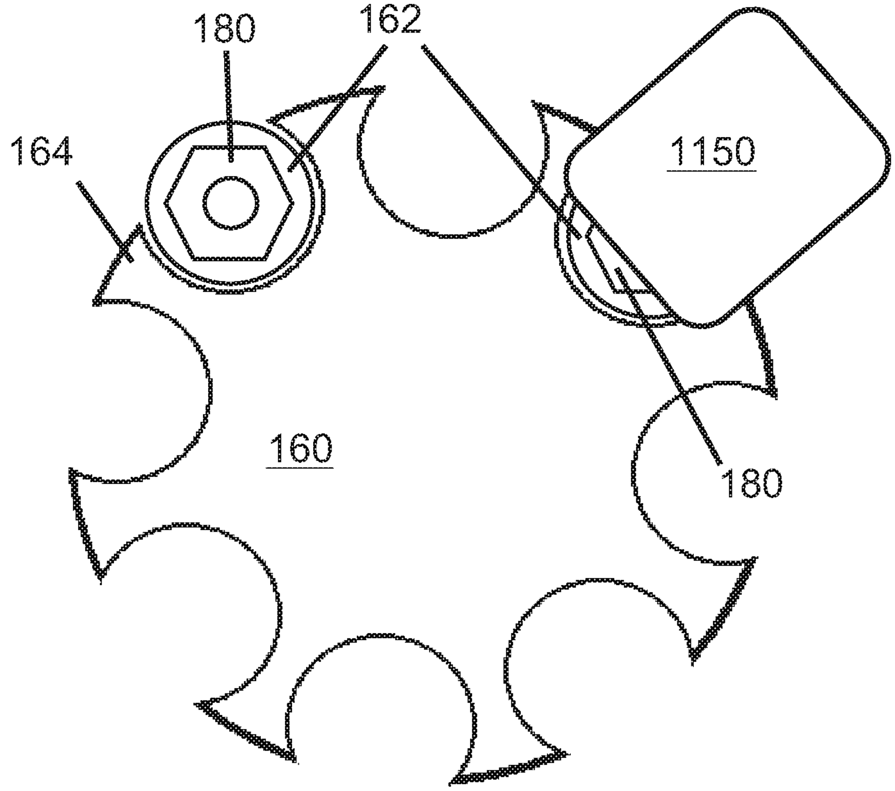
FIG. 27 is a drawing of an embodiment of the present invention
Figure 28:
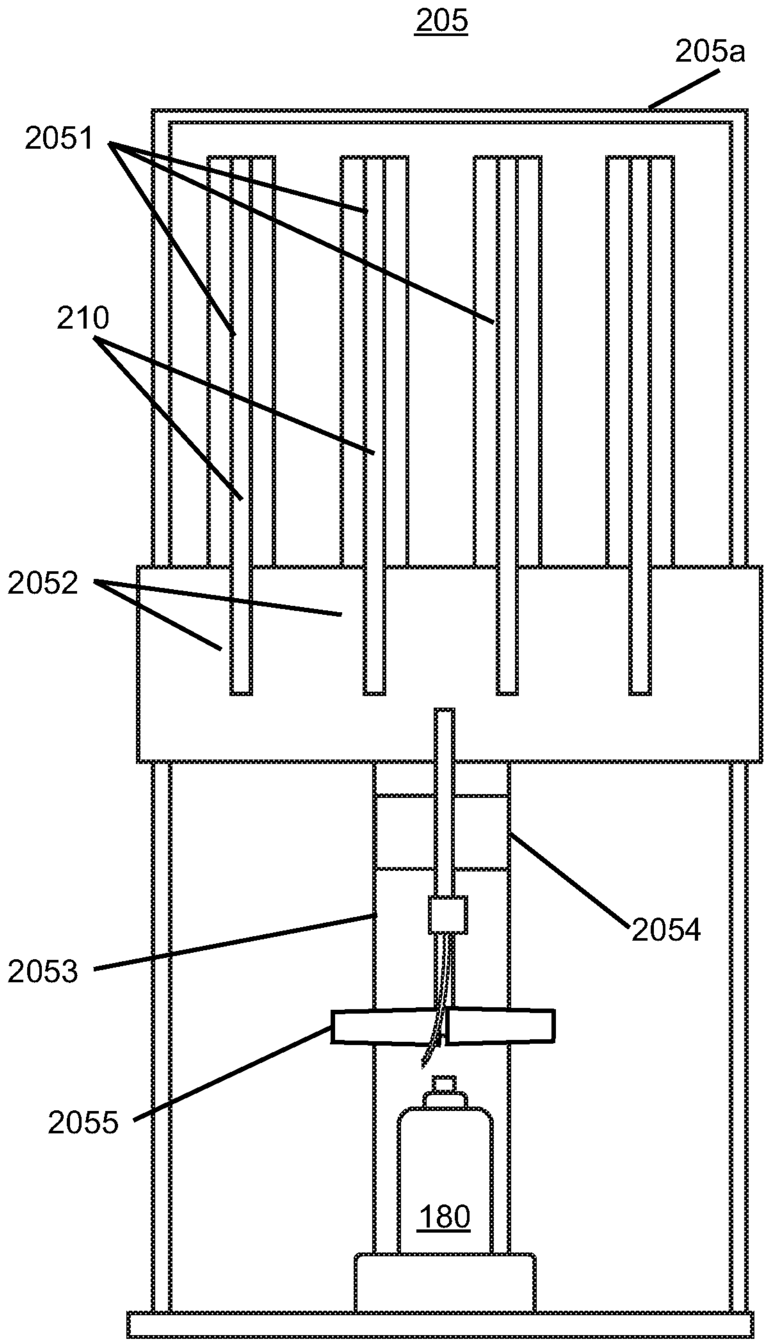
FIG. 28 is a partial view of an embodiment of the present invention

In one embodiment of the invention, in FIG. 26, a horizontal (or flat) conveyor 160 may be used to transport the container along dispenser lane 161. In this embodiment, Dispenser lane 161 is formed on the surface 161*a* of the conveyor belt 160. In another embodiment of the invention, illustrated in FIG. 27, a supply wheel conveyor is used to transport the container 180 to filling platform 1159. The supply wheel conveyor may have openings where container 180 may be positioned and transported between stations.

While all embodiments have been described with a reference to a conveyor belt, it should be understood that the present invention is not limited by that description and any other conveyor or conveying system known in the art can be used, for example rollers, beads, skate wheels, chains, plates, and others. The conveyor maybe powered, gravity driven, or a combination thereof. While the embodiments herein have been described with a reference to a conveyor 160 with cleats 164, it should be understood that the cleats 164 may not be needed in some embodiment depending on the style or type of conveyor used, and the characteristic (e.g., size, weight, speed, etc.) of container 180, or of puck 162.

While the invention has been described with reference to exemplary embodiments, it will be understood by those skilled in the art that various changes, omissions, and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiments disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

We claim:

1. A generative scent design system comprising:
a frame;
an input receiver;
an input processor;
a dispenser;
a dispenser lane;
a conveyor;
a container; and,
a filling platform;
wherein the dispenser comprises:
a dosing station; and,
a storage compartment;
wherein the dosing station and the filling platform are attached to the frame;
wherein the dosing station comprises a plurality of pumps;
wherein each pump is associated with a respective heating system;
wherein the respective heating system regulates the temperature of its associated pump;
wherein the storage compartment comprises a plurality of scent vessels;
wherein each scent vessel contains a respective scent;
wherein each pump comprises an inlet and, an outlet;
wherein each pump is associated with its respective scent;
wherein each pump is in fluid communication through the inlet with the scent vessel containing the respective scent;
wherein each pump is configured to dispense its respective scent through the outlet;
wherein the container is movably positioned on the filling platform to receive the respective scent from each pump;
wherein the input receiver receives data;
wherein the data is selected from the group consisting of questionnaire answers, user-entered data, social-media based data, biometric feedback, stock exchange based data, weather based data, personal emotion based data, sports based data, sound based data, smell based data, sensor based data, image based data, and combinations thereof;
wherein the conveyor transports the container along the dispenser lane to allow the container to be movably positioned on the filling platform to receive the respective scents from the plurality of pumps; and,
wherein the input processor calculates the data to determine a formulation containing an amount of each respective scent.

2. The generative scent design system of claim 1, further comprising a puck for retaining the container.

3. The generative scent design system of claim 1 further comprises a dispenser manifold;

wherein the dispenser manifold is configured to hold the plurality of pumps to allow the plurality of pumps to dispense the respective scents simultaneously into the container.

4. The generative scent design system of claim 2, wherein the conveyor comprises a plurality of cleats;

wherein the plurality of cleats is configured to hold the puck on the dispenser lane.

5. The generative scent design system of claim 2, wherein the conveyor is a horizontal rotating conveyor.

6. The generative scent design system of claim 2 further comprises a labeling station;

wherein the labeling station comprises:

a label printer; and, a label applicator;

wherein the input processor generates information for a label;

wherein the label printer prints the label; and, wherein the label applicator affixes the label to the container.

7. The generative scent design system of claim 2 further comprises:

a capping system; and, a crimper;

wherein the capping system positions a cap on the container; and, wherein the crimper crimps the cap on the container.

8. The generative scent design system of claim 2 further comprises a container dispenser;

wherein the container dispenser delivers the container onto the dispenser lane;

wherein the container dispenser comprises:

a supply conveyor;

a supply gate; and, a supply elevator comprising a supply elevator platform;

wherein the supply conveyor moves a puck holding a container onto the supply elevator platform;

wherein the supply gate regulates the movement of the puck holding a container from the supply conveyor to the supply elevator;

wherein the supply elevator transports the puck holding a container to the dispenser lane; and, wherein the supply elevator platform supports the puck holding a container on the supply elevator until the puck holding a container reaches the conveyor.

9. The generative scent design system of claim 2, wherein the respective scents are perfume ingredients.

10. The generative scent design system of claim 2, wherein the respective scents are beverage ingredients selected from the group consisting of alcoholic drink ingredients, non-alcoholic drink ingredients and combinations thereof.

11. The generative scent design system of claim 2, wherein the respective scents are liquid personal products ingredients.

12. The generative scent design system of claim 2 further comprises an exit station comprising a container hook;

wherein the container hook removes the container from the conveyor.

13. The generative scent design system of claim 2, wherein each scent vessel comprises an ID tag;

wherein the storage compartment further comprises a reader;

wherein the ID tag contains information related to the respective scents; and, wherein the reader can read from the ID tag the information related to the respective scents.

14. The generative scent design system of claim 1, wherein the plurality of scent vessels are vacuum flexible containers.

15. The generative scent design system of claim 1, wherein each respective heating system comprises:

a heating element;

a temperature sensor;

a heat-transferring medium; and, a controller;

wherein the heat-transferring medium transfers heat from the heating element to the respective pump.

16. A generative scent design system comprising:

a frame;

an input receiver;

an input processor;

a dispenser;

a container; and, a filling platform;

wherein the dispenser comprises:

a dosing station; and, a storage compartment;

wherein the dosing station and the filling platform are attached to the frame;

wherein the dosing station comprises a plurality of valves;

wherein each valve is associated with a respective heating system;

wherein the respective heating system regulates the temperature of its associated valve;

wherein the storage compartment comprises a plurality of scent vessels;

wherein each scent vessel contains a respective scent;

wherein each valve comprises:

an inlet; and, an outlet;

wherein each valve is associated with its respective scent vessel;

wherein each valve is in fluid communication with its respective scent vessel through the inlet;

wherein each valve is configured to dispense its respective scent through the outlet;

wherein the container is movably positioned on the filling platform to receive the respective scent from each valve;

wherein the input receiver receives data;

wherein the data is selected from the group consisting of questionnaire answers, user-entered data, social-media based data, biometric feedback, stock exchange based data, weather based data, personal emotion based data, sports based data, sound based data, smell based data, sensor based data, image based data, and combinations thereof; and, wherein the input processor calculates the data to determine a formulation containing an amount of each respective scent;

wherein the storage compartment is a pressured storage compartment;

wherein the scent vessels are flexible bags;

wherein the scent vessels are positioned inside the storage compartment; and, wherein the pressure inside the storage compartment forces the respective scent out of the scent vessel when the associated valve is opened to allow dispensing of the respective scent into the container.

17. The generative scent design system of claim 16, further comprising a puck for retaining the container.

18. A generative scent design system comprising:

a frame;

an input receiver;

an input processor;

a dispenser;

a container; and, a filling platform;

wherein the dispenser comprises:

a dosing station; and, a storage compartment;

wherein the dosing station and the filling platform are attached to the frame;

wherein the dosing station comprises a plurality of pumps;

wherein each pump is associated with a respective heating system;

wherein the respective heating system regulates the temperature of its associated pump;

wherein the storage compartment comprises a plurality of scent vessels;

wherein each scent vessel contains a respective scent from a plurality of scents;

wherein each pump comprises an inlet and an outlet;

wherein each pump is associated with its respective scent;

wherein each pump is in fluid communication through the inlet with the scent vessel containing the respective scent;

wherein each pump is configured to dispense its respective scent through the outlet according to a formulation containing an amount of each respective scent;

wherein each respective scent the plurality of scents is associated with one or more plurality of scent descriptor;

wherein the input receiver is configured to receive input data comprising one or more of sound data, visual data, text data, and personal data;

wherein the input processor is configured to analyze the input data to determine one or more input data descriptors;

wherein the one or more input data descriptors are selected from a group consisting of a sound descriptor, a visual descriptor, a personal descriptor, a text descriptor, and combinations thereof;

wherein the input processor is configured to correlate the one or more input data descriptors with the one or more scent descriptors from the plurality of scents descriptors; and, wherein the input processor is configured to generate the formulation containing an amount of each respective scent according to the one or more scent descriptors.

* * * * *